(12) United States Patent
Kurabayashi

(10) Patent No.: US 10,722,785 B2
(45) Date of Patent: Jul. 28, 2020

(54) INFORMATION PROCESSING SYSTEM, PROGRAM, SERVER, TERMINAL, AND MEDIUM

(71) Applicant: CYGAMES, INC., Tokyo (JP)

(72) Inventor: Shuichi Kurabayashi, Tokyo (JP)

(73) Assignee: CYGAMES, INC., Tokyo (JP)

( * ) Notice: Subject to any disclaimer, the term of this patent is extended or adjusted under 35 U.S.C. 154(b) by 154 days.

(21) Appl. No.: 15/680,843

(22) Filed: Aug. 18, 2017

(65) Prior Publication Data
US 2017/0340960 A1   Nov. 30, 2017

Related U.S. Application Data

(63) Continuation of application No. PCT/JP2016/052644, filed on Jan. 29, 2016.

(30) Foreign Application Priority Data

Feb. 26, 2015 (JP) .................................. 2015-036893

(51) Int. Cl.
*A63F 13/2145* (2014.01)
*A63F 13/73* (2014.01)
(Continued)

(52) U.S. Cl.
CPC .......... *A63F 13/2145* (2014.09); *A63F 13/25* (2014.09); *A63F 13/35* (2014.09);
(Continued)

(58) Field of Classification Search
CPC ...... A63F 13/2145; A63F 13/25; A63F 13/35; A63F 13/40; G06F 3/0346; G06F 3/044;
(Continued)

(56) References Cited

U.S. PATENT DOCUMENTS

2011/0049234 A1* 3/2011 Yoshida ............... G06F 3/0421
235/380
2011/0108625 A1   5/2011 Lee
(Continued)

FOREIGN PATENT DOCUMENTS

JP   2006-185338 A   7/2006
JP   2009-542259 A   12/2009
(Continued)

OTHER PUBLICATIONS

International Search Report issued in PCT/JP2016/052644, dated Apr. 19, 2016 (2 pages).
(Continued)

*Primary Examiner* — William H McCulloch, Jr.
*Assistant Examiner* — Yingchuan Zhang
(74) *Attorney, Agent, or Firm* — Osha Liang LLP

(57) ABSTRACT

A card has a plurality of contact points attached on the same face thereof, the plurality of contact points being detectable by a detecting method for a touchscreen. In the case where the card is placed on the touchscreen, a recognition unit recognizes a kind of the card and a relative position and orientation of the card relative to the touchscreen on the basis of at least some of the plurality of contact points detected by the touchscreen. On the basis of the results of recognition by the recognition unit, a determining unit determines a relevant image to be displayed on the touchscreen and determines a size, position, and orientation for displaying the relevant image on the touchscreen.

10 Claims, 13 Drawing Sheets

(51) Int. Cl.
   *A63F 13/69* (2014.01)
   *A63F 13/95* (2014.01)
   *A63F 13/25* (2014.01)
   *A63F 13/35* (2014.01)
   *A63F 13/40* (2014.01)
   *G06F 3/0346* (2013.01)
   *G06F 3/044* (2006.01)
   *G06F 3/0488* (2013.01)
   *G06T 3/00* (2006.01)
   *G06F 3/041* (2006.01)

(52) U.S. Cl.
   CPC .............. *A63F 13/40* (2014.09); *A63F 13/69* (2014.09); *A63F 13/73* (2014.09); *A63F 13/95* (2014.09); *G06F 3/0346* (2013.01); *G06F 3/044* (2013.01); *G06F 3/0488* (2013.01); *G06T 3/0006* (2013.01); *G06F 3/041* (2013.01); *G06F 2203/04101* (2013.01); *G06F 2203/04108* (2013.01); *G06F 2203/04808* (2013.01)

(58) Field of Classification Search
   CPC ... G06F 3/0488; G06T 3/0006; G06T 11/001; G06K 5/00; G09G 5/377
   See application file for complete search history.

(56) References Cited

U.S. PATENT DOCUMENTS

| | | | | |
|---|---|---|---|---|
| 2013/0328928 | A1* | 12/2013 | Yamagishi | G02B 27/017 345/633 |
| 2014/0002417 | A1 | 1/2014 | Yoshida | |
| 2015/0243258 | A1* | 8/2015 | Howe | G06T 11/001 345/629 |
| 2016/0062482 | A1* | 3/2016 | Nietvelt | G06F 3/0488 345/173 |
| 2016/0147338 | A1 | 5/2016 | Chiba | |

FOREIGN PATENT DOCUMENTS

| | | | | |
|---|---|---|---|---|
| JP | 2012-168612 | * | 6/2012 | ............ G06F 3/033 |
| JP | 2012-168612 A | | 9/2012 | |
| JP | 2013-168187 A | | 8/2013 | |
| JP | 2014-067429 A | | 4/2014 | |
| JP | 2014-199479 A | | 10/2014 | |
| JP | 2014-237016 A | | 12/2014 | |
| WO | 2008/060641 A2 | | 5/2008 | |
| WO | 2015/008828 A1 | | 1/2015 | |

OTHER PUBLICATIONS

Written Opinion issued in PCT/JP2016/052644, dated Apr. 19, 2016 (4 pages).

Notice of Reasons for Refusal issued in JP2015-036893, dated Aug. 4, 2015 (3 pages).

Notice of Reasons for Refusal issued in JP2015-036893, dated Dec. 22, 2015 (3 pages).

* cited by examiner

FIG. 10

| START POINT NO. | END POINT NO. | BIT ARRAY INDEX |
|---|---|---|
| 1 | 4 | 0 |
| 1 | 5 | 1 |
| 1 | 6 | 2 |
| ... | ... | ... |
| 8 | 9 | 32 |

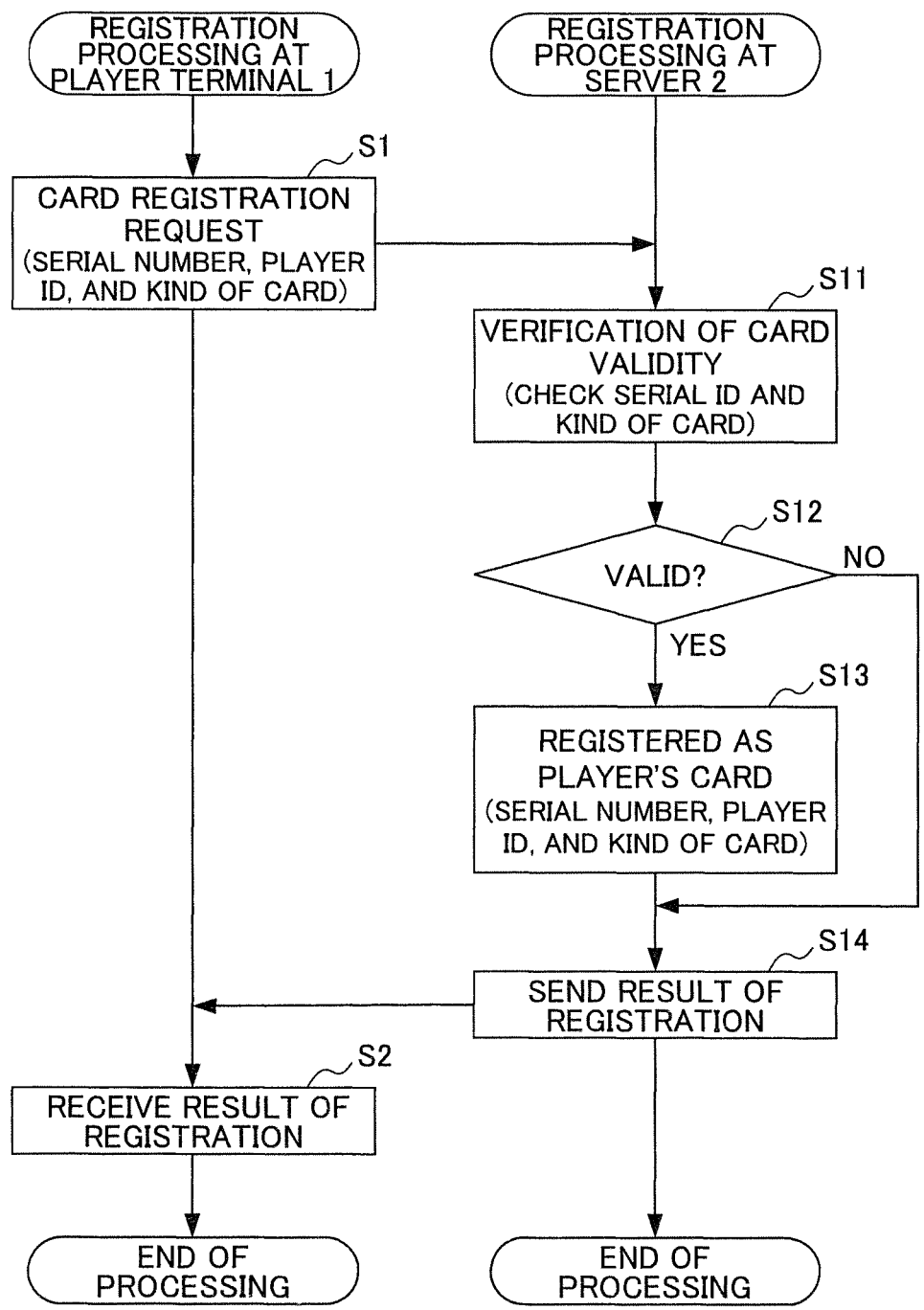

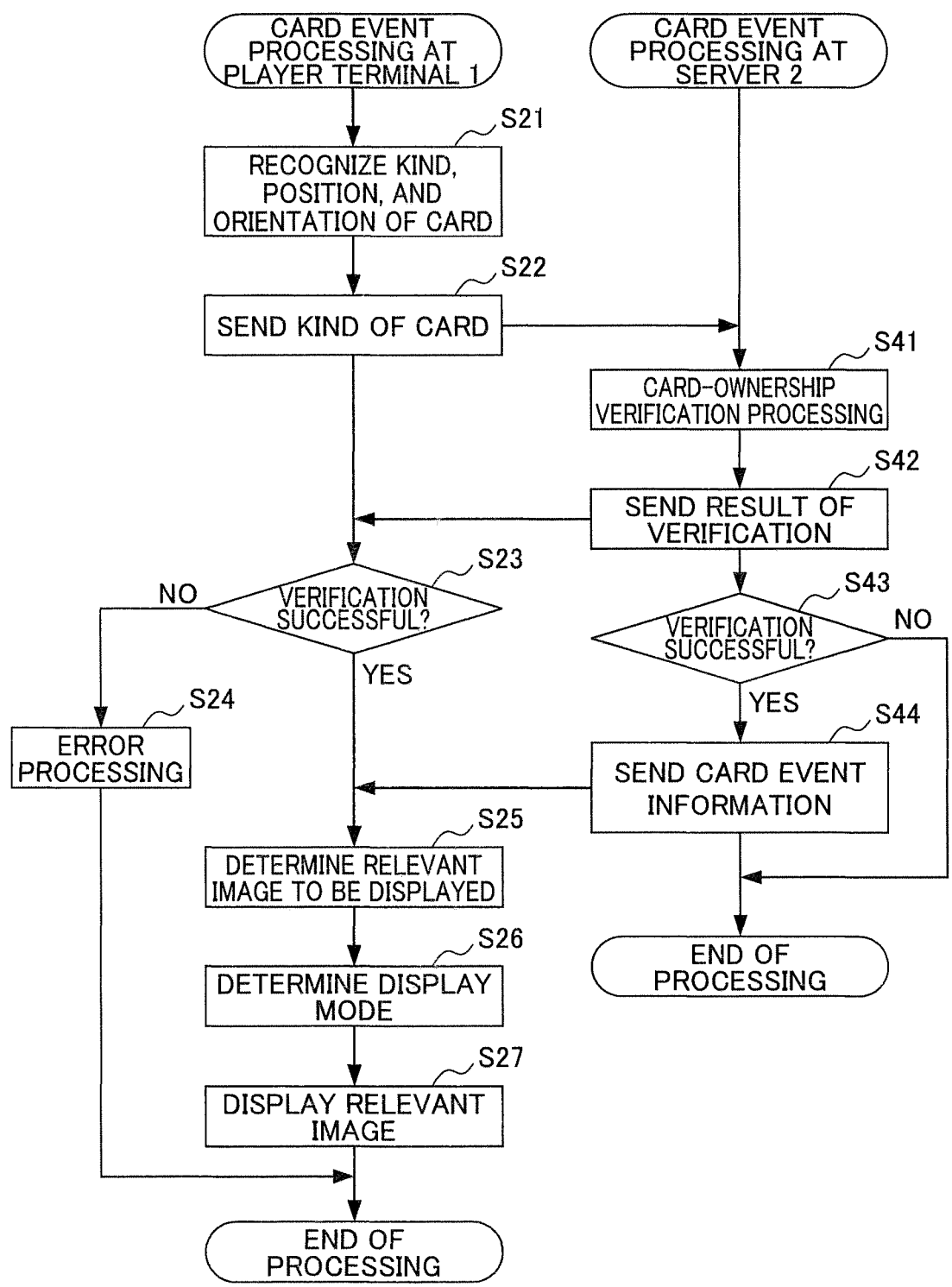

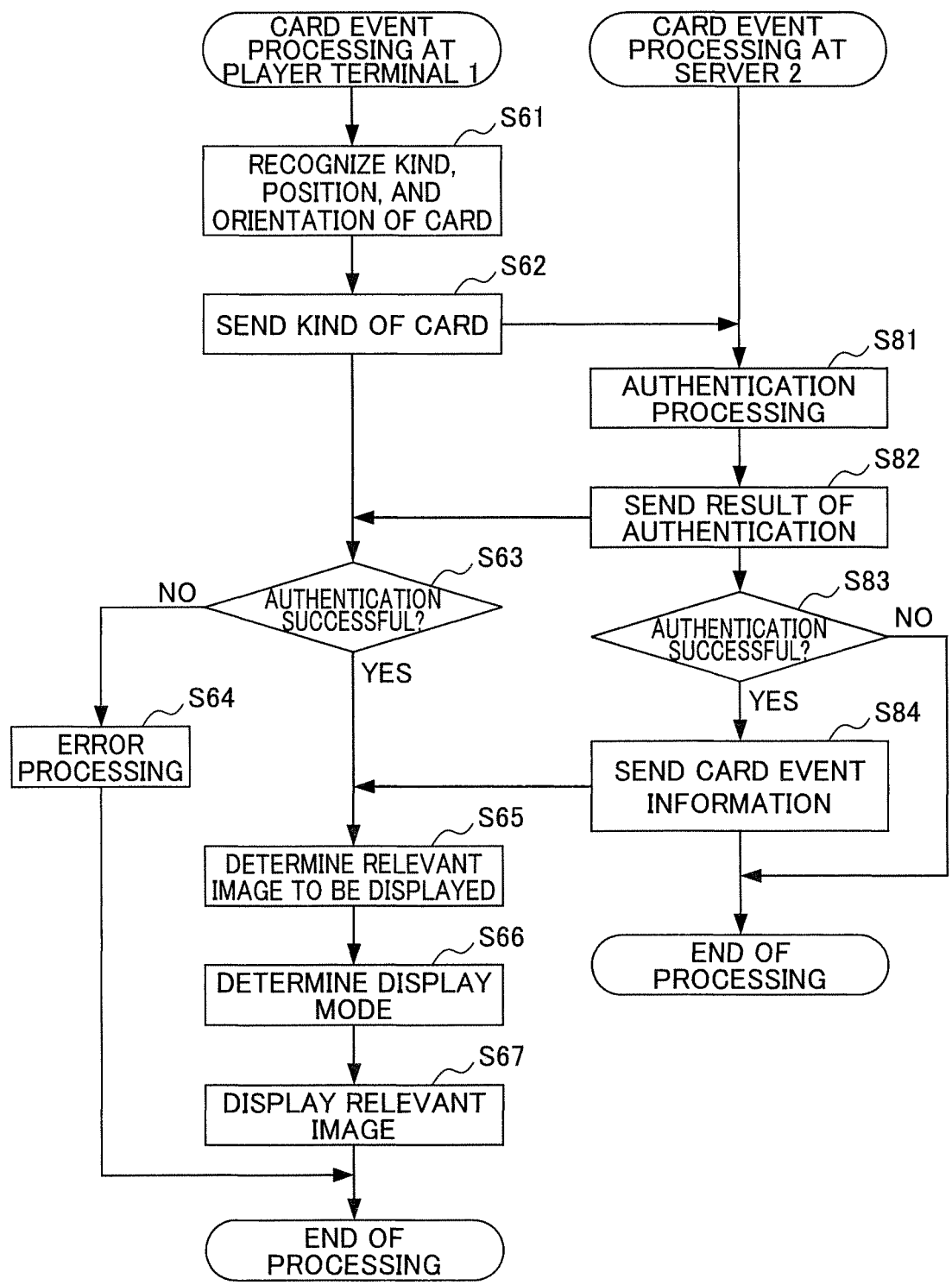

INFORMATION PROCESSING SYSTEM, PROGRAM, SERVER, TERMINAL, AND MEDIUM

TECHNICAL FIELD

The present invention relates to information processing systems, programs, servers, terminals, and media.

BACKGROUND ART

As games that can be played on terminals such as smartphones, games involving applications of technology for coordinating a virtual space (game space) inside a terminal with the real world outside the terminal are becoming common. As an example of such technology, there is a technology in which an image of a space in the real world is captured by using a built-in camera of a terminal and in which the captured image is utilized in a virtual space. As another example, there is a technology in which an object (e.g., a figure) in the real world is associated with an object in a virtual world by using short-distance communication, such as NFC (registered trademark) or iBeacon (registered trademark).

With these existing technologies, it is necessary for a reader device on the terminal side to support a non-standard technology, such as NFC (registered trademark) or iBeacon (registered trademark), or there is a risk of invading the privacy of third parties that are included when an image of the surroundings of a player is captured by using a built-in camera.

Accordingly, as a technology for coordinating a virtual space inside a terminal with the real world outside the terminal, there is a demand for establishing a technology that uses a standard device commonly provided on most terminals (desirably all terminals) and that involves only low risk of privacy invasion. Here, an example of such a standard device is a touchscreen (e.g., see Patent Literature 1), which is provided on almost all smartphones. Thus, the above demand will be satisfied by establishing a technology that enables seamless coordination between a virtual space displayed on a touchscreen and a medium such as a physical card in a state where the medium is placed on the touchscreen.

Patent Literature 1: Japanese Unexamined Patent Application, Publication No. 2006-185338

DISCLOSURE OF THE INVENTION

Problems to be Solved by the Invention

However, even if existing technologies are applied, including Patent Literature 1, it is very difficult to establish a technology that enables seamless coordination between a virtual space inside a touchscreen and a physical medium disposed outside the touchscreen.

Specifically, in order to coordinate an image inside a virtual space of a touchscreen with a medium existing in a space in the real world, it is necessary to dynamically obtain the following first to fourth attributes and to dynamically change the size, position, and angle of content that is displayed on the touchscreen. The first attribute is the size ratio of the touchscreen (display) that displays the virtual space and the medium in the real space. The second attribute is the position at which the medium in the real space is placed relative to the touchscreen. The third attribute is the ratio of the size of one dot on the touchscreen, known as the DPI (dots per inch), to the medium. The fourth attribute is the angle of horizontal rotation (orientation) of the medium in the real space, when placed on the touchscreen. However, existing technologies, including Patent Literature 1, do not involve technology for dynamically obtaining these four attributes. Thus, image processing technology that enables coordination between an image in a virtual space and a medium existing in a space in the real world by using these four attributes has not been realized.

The first to fourth attributes described above will hereinafter be referred to collectively as a "positional relationship of the medium relative to the touchscreen". Furthermore, technology for dynamically obtaining these four attributes will be referred to as technology for recognizing a "positional relationship of the medium relative to the touchscreen".

Specifically, for example, in the technology of Patent Literature 1, it is a prerequisite that the medium and the touchscreen have substantially the same shape. Thus, when placing the medium on the touchscreen, it is necessary to accurately align the medium with the touchscreen.

Here, the size of the touchscreen of a terminal is not particularly standardized. That is, the size of the touchscreen varies depending on the type of terminal. Thus, with the technology of Patent Literature 1, it is not possible to manufacture a medium that can be used on a plurality of types of terminals. In other words, in order to manufacture a medium that can be used on a plurality of types of terminals having touchscreens of mutually different sizes, a technology for recognizing a positional relationship of a medium relative to a touchscreen is required. However, the technology of Patent Literature 1 does not involve such a recognition technology.

Furthermore, although it may be possible to manufacture a medium designed exclusively for a predetermined kind of terminal by applying the technology of Patent Literature 1, it is not practical, considering the nature of a game, to request a player to place the medium in accurate alignment with a touchscreen. That is, assuming that a medium is placed on a touchscreen in a game application or the like, it is presupposed that the positional relationship of the medium relative to the touchscreen is not fixed but changes with time. Under this presupposition, a technology for recognizing a positional relationship of the medium relative to the touchscreen is required. Therefore, for the same reason as in the preceding paragraph, it is not possible to apply the technology of Patent Literature 1.

Furthermore, there is no particular need to standardize the size or shape of media, such as cards. Rather, for the purpose of popularizing games, it is preferable to allow arbitrary sizes and shapes of cards. In order to use a plurality of types of media having different sizes and shapes, again, a technology for recognizing a positional relationship of the medium relative to the touchscreen is required. Therefore, for the same reason as in the two preceding paragraphs, it is not possible to apply the technology of Patent Literature 1.

To summarize what has been described above, in order to establish a technology that enables seamless coordination between a virtual space inside a touchscreen and a physical medium disposed outside the touchscreen, a technology for recognizing the positional relationship of a medium relative to a touchscreen of an arbitrary size, irrespective of the size or shape of the medium, is required. However, existing technologies, including Patent Literature 1, do not involve such a recognition technology.

The present invention has been made in view of the situation described above, and it is an object thereof to establish a technology that enables seamless coordination between a virtual space displayed on a touchscreen and a medium such as a physical card in a state where the medium is placed on the touchscreen.

Means for Solving the Problems

In order to achieve the above object, an information processing system according to an aspect of the present invention is an information processing system including: a terminal including a display unit that displays an image on a predetermined display surface thereof; and a detecting unit that is laid over the display surface and that detects, by a predetermined method, something brought into contact therewith or in proximity thereto; a medium having a plurality of contact points detectable by the predetermined method, attached on the same face thereof; and an information processing apparatus that carries out communications with the terminal to send and receive information, wherein the information processing system includes: recognition means for recognizing, in a case where the medium is placed on the display surface, a kind of the medium and a position and orientation of the medium relative to the display surface on the basis of at least some of the plurality of contact points detected by the detecting unit; and determining means for determining a relevant image to be displayed on the display surface and determining a size, position, and orientation for displaying the relevant image on the display surface, on the basis of the results of recognition by the recognition means.

A program according to an aspect of the present invention is a program corresponding to the above-described information processing system according to one aspect of the present invention.

A server according to an aspect of the present invention is a server in an information processing system including: a terminal that is operated by a player, the terminal including a display unit that displays an image on a predetermined display surface thereof; and a detecting unit that is laid over the display surface and that detects, by a predetermined method, something brought into contact therewith or in proximity thereto; a plurality of media each having a plurality of contact points detectable by the predetermined method, attached on the same face thereof, and each showing a predetermined object; and the server, which carries out communications with the terminal to send and receive information, wherein the server includes: management means for managing, for each of the plurality of media, a kind of the medium and the object in association with each other; recognition means for recognizing the kind of one of the plurality of media in a case where the medium is placed on the display surface at the terminal, the kind of the medium and a relative position and orientation of the medium relative to the display surface are recognized on the basis of at least some of the plurality of contact points detected by the detecting unit, and a notification of the kind of the medium is received; and providing means for identifying the object associated with the recognized kind of the medium among the plurality of media and providing the terminal with, among information about the identified object, information that serves as an aid in processing for determining a relevant image to be displayed on the display surface and determining a size, position, and orientation for displaying the relevant image on the display surface.

A terminal according to an aspect of the present invention includes: a display unit that displays an image on a predetermined display surface thereof; a detecting unit that is laid over the display surface and that detects, by a predetermined method, something brought into contact therewith or in proximity thereto: a recognition unit that recognizes, in a case where a medium having a plurality of contact points detectable by the predetermined method, attached on the same face thereof, is placed on the display surface, a kind of the medium and a position and orientation of the medium relative to the display surface on the basis of at least some of the plurality of contact points detected by the detecting unit; and a determining unit that determines a relevant image to be displayed on the display surface and that determines a size, position, and orientation for displaying the relevant image on the display surface, on the basis of the results of recognition by the recognition unit. This enables the terminal to execute processing off-line without having to carry out communications with a server or the like.

A medium according to an aspect of the present invention is a medium that can be placed on a predetermined display surface of a terminal, wherein the terminal includes: a display unit that displays an image on the predetermined display surface thereof; and a detecting unit that is laid over the display surface and that detects, by a predetermined method, something brought into contact therewith or in proximity thereto, wherein the medium has a plurality of contact points detectable by the predetermined method, attached on the same face thereof, and wherein at least some of the plurality of contact points are laid out so as to enable the terminal to recognize a kind of the medium and a position and orientation of the medium relative to the display surface.

Effects of the Invention

The present invention makes it possible to establish a technology that enables seamless coordination between a virtual space displayed on a touchscreen and a medium such as a physical card in a state where the medium is placed on the touchscreen.

BRIEF DESCRIPTION OF THE DRAWINGS

FIG. 10 is a chart showing an example of a method of generating a code representing the kind of card.

FIG. 11 is a flowchart for explaining an example of the flow of registration processing executed at the player terminal and server in FIG. 6.

FIG. 12 is a flowchart for explaining an example of the flow of card event processing executed at the player terminal and server in FIG. 6.

FIG. 13 is a flowchart for explaining an example of the flow of card event processing executed at the player terminal and server in FIG. 6, which is different from the example in FIG. 12.

PREFERRED MODE FOR CARRYING OUT THE INVENTION

An embodiment of the present invention will be described below with reference to the drawings.

It is to be understood that what are simply referred to as "images" hereinafter should be construed to include both "moving images" and "still images". Furthermore, "moving images" should be construed to include images that are displayed individually through the following first processing to third processing. First processing refers to processing for displaying a series of still images, while continuously switching among them as time passes, for individual actions of objects (e.g., game characters) in planar images (2D images). Specifically, two-dimensional animation, i.e., processing similar to what is called book flipping, is an example of first processing. Second processing refers to processing for presetting motions corresponding to individual actions of objects (e.g., game characters) in stereoscopic images (images based on 3D models) and displaying the objects while changing the motions as time passes. Specifically, three-dimensional animation is an example of second processing. Third processing refers to processing for preparing videos (i.e., moving images) corresponding to individual actions of objects (e.g., game characters) and rendering the videos as time passes.

Figure 1:
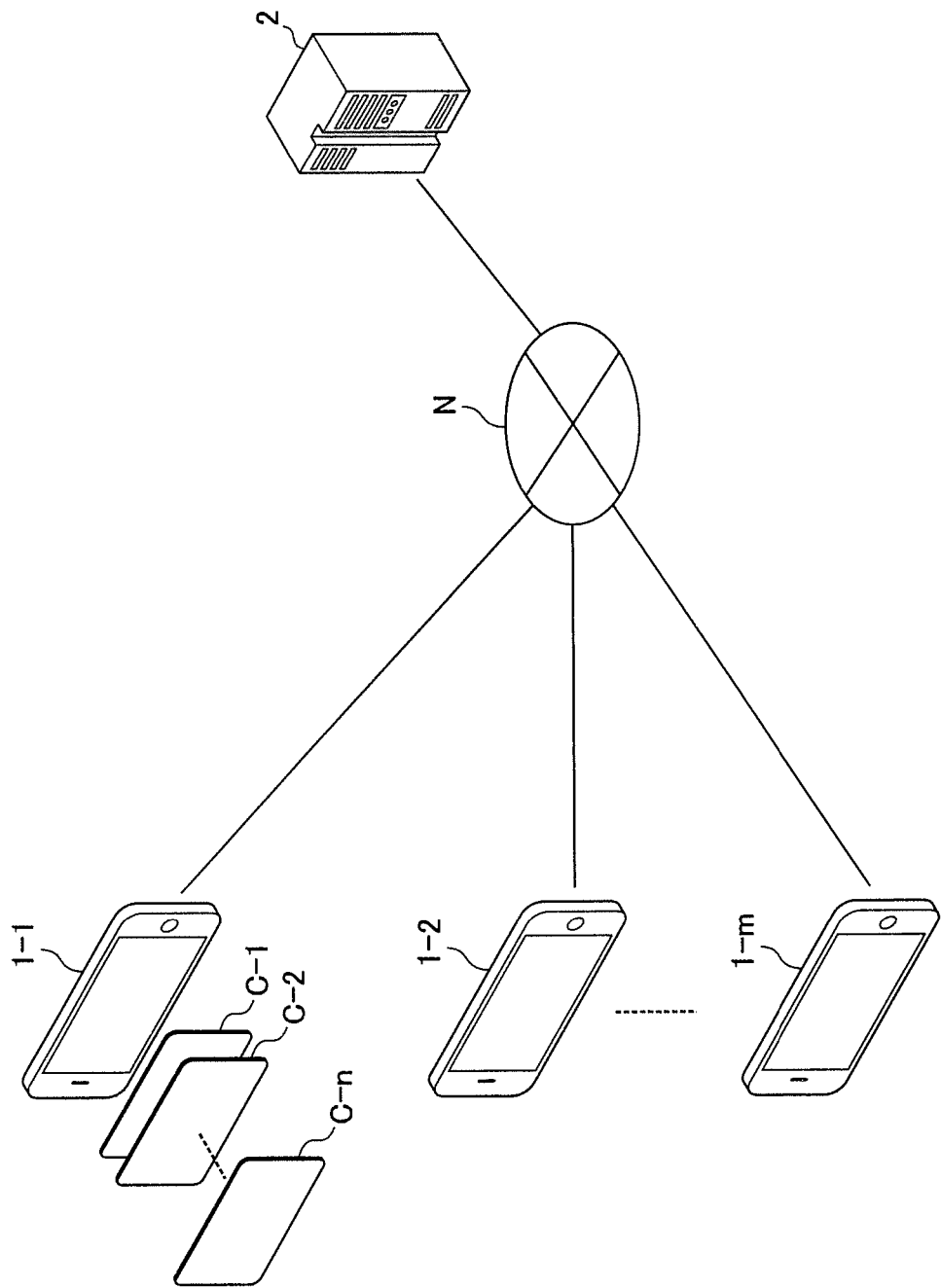
FIG. 1 is a block diagram showing the configuration of an information processing system according to an embodiment of the present invention.

FIG. 1 shows the configuration of an information processing system according to an embodiment of the present invention. The information processing system shown in FIG. 1 is a system including player terminals 1-1 to 1-*m* individually used by m players (m is an arbitrary integer greater than or equal to 1) and also including a server 2. The individual player terminals 1-1 to 1-*m* and the server 2 are connected to each other via a predetermined network N, such as the Internet.

The server 2 provides the individual player terminals 1-1 to 1-*m* with a game execution environment to provide various services relating to a game that is executed at the individual player terminals 1-1 to 1-*m*.

The game in this embodiment includes events (hereinafter referred to as "card events") individually corresponding to n (n is an arbitrary integer greater than or equal to 1) cards C-1 to C-n possessed by players. When an arbitrary card among the cards C-1 to C-n is placed on the display surface of the player terminal 1-1, a card event corresponding to the placed card occurs. Specific examples of card events will be described later with reference to FIGS. 4 and 5. It is to be noted that, although FIG. 1 shows only the cards C-1 to C-n associated with the player terminal 1-1, obviously, arbitrary cards can be placed similarly on each of the player terminals 1-2 to 1-*m*.

Hereinafter, in the case where there is no need for distinction among the individual player terminals 1-1 to 1-*m*, these will be referred to collectively as "player terminals 1". Also, in the case where there is no need for distinction among the individual cards C-1 to C-n, these will be referred to collectively as "cards C".

Figure 2:
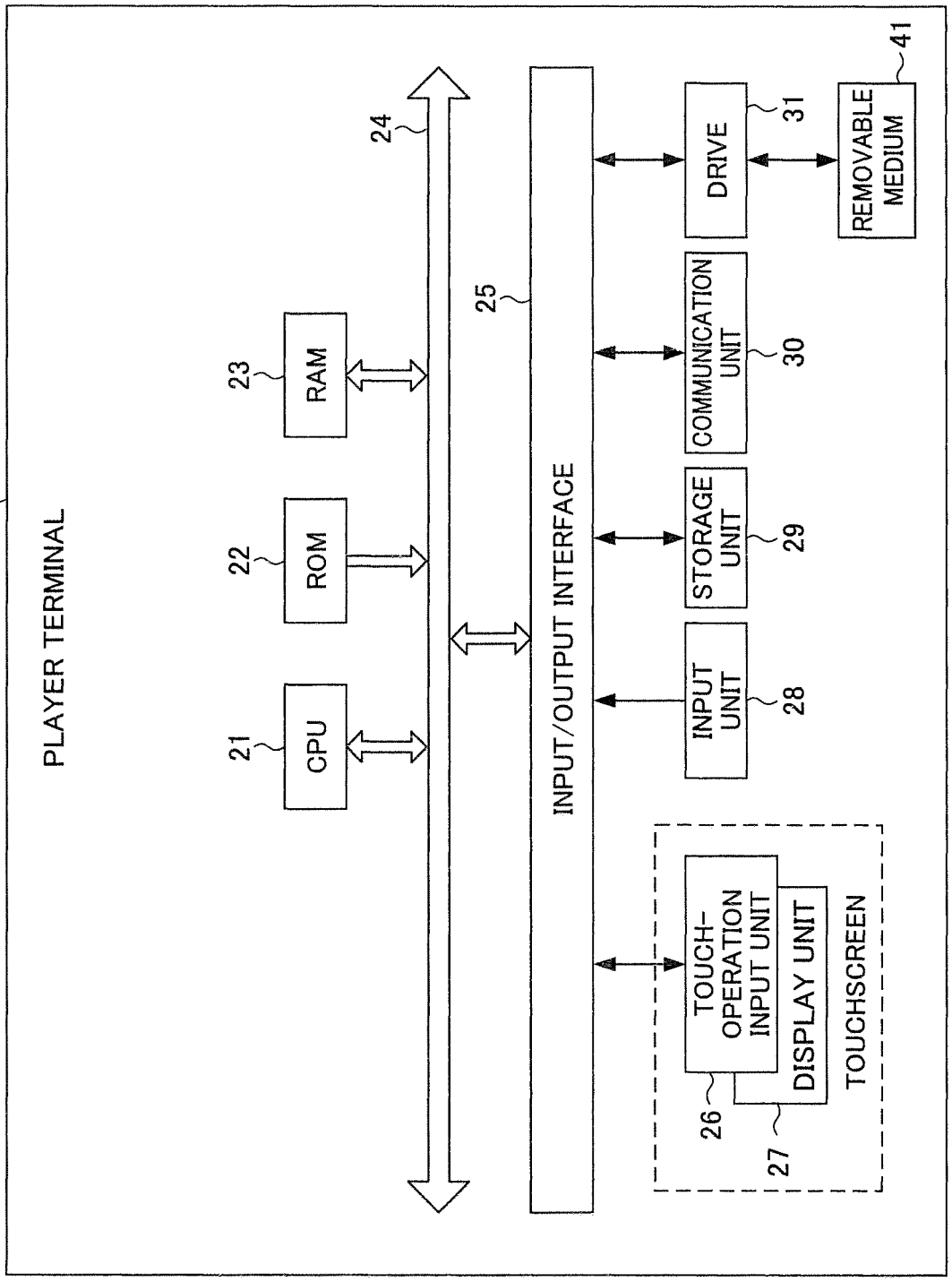
FIG. 2 is a block diagram showing, in the information processing system in FIG. 1, the hardware configuration of a player terminal as an embodiment of a terminal according to the present invention.

FIG. 2 is a block diagram showing, in the information processing system in FIG. 1, the hardware configuration of a player terminal 1 as an embodiment of a terminal according to the present invention.

The player terminal 1 is implemented by a smartphone or the like. The player terminal 1 includes a CPU (Central Processing Unit) 21, a ROM (Read Only Memory) 22, a RAM (Random Access Memory) 23, a bus 24, an input/output interface 25, a touch-operation input unit 26, a display unit 27, an input unit 28, a storage unit 29, a communication unit 30, and a drive 31.

The CPU 21 executes various kinds of processing according to programs recorded in the ROM 22 or programs loaded from the storage unit 29 into the RAM 23. The RAM 23 also stores, as appropriate, data, etc. that are needed when the CPU 21 executes various kinds of processing.

The CPU 21, the ROM 22, and the RAM 23 are connected to each other via the bus 24. The input/output interface 25 is also connected to the bus 24. The touch-operation input unit 26, the display unit 27, the input unit 28, the storage unit 29, the communication unit 30, and the drive 31 are connected to the input/output interface 25.

The touch-operation input unit 26 is constituted of, for example, capacitive or resistive (pressure-sensitive) position input sensors that are laid over the display surface of the display unit 27, which detect the coordinates of a position at which a touch operation is performed. The touch operation here refers to bringing something into contact with or in proximity to the touch-operation input unit 26. What is brought into contact with or in proximity to the touch-operation input unit 26 is, for example, a player's finger or a stylus, and includes a plurality of contact points formed on a card C (the contact points will be described later with reference to FIGS. 7 to 10, etc.) in this embodiment. Hereinafter, a position at which a touch operation is performed will be referred to as a "touched position", and the coordinates of the touched position will be referred to as "touched coordinates". In this embodiment, it is necessary to detect a plurality of touched positions, i.e., to detect what is called a multi-touch, as will be described later in detail. A multi-touch can be implemented, for example, by using resistive technology or capacitive technology; however, any technology may be adopted, without limitation to resistive technology or capacitive technology. In the following description, however, it is assumed that capacitive position input sensors that are capable of simultaneously detecting ten touched positions are adopted as the touch-operation input unit 26. That is, since humans have ten fingers on their hands, it is assumed that the touch-operation input unit 26 is configured so as to enable detection of positions individually touched with ten fingers in the case where a touch operation is performed simultaneously with all the ten fingers. The display unit 27 is implemented by a display, such as a liquid crystal display, and displays various kinds of images, such as images related to the game. As described above, in this embodiment, a touchscreen is constituted of the touch-operation input unit 26 and the display unit 27.

The input unit 28 is constituted of various kinds of hardware buttons, etc. and allows input of various kinds of information in accordance with instruction operations performed by the player. The storage unit is implemented by a DRAM (Dynamic Random Access Memory) or the like and stores various kinds of data. The communication unit 30 controls communications carried out with other devices (the server 2 and the other player terminals 1 in the example in FIG. 1) via the network N, including the Internet.

The drive 31 is provided as needed. A removable medium 41 implemented by a magnetic disk, an optical disk, a magneto-optical disk, a semiconductor memory, or the like is loaded in the drive 31 as appropriate. A program read from the removable medium 41 by the drive 31 is installed in the storage unit 29 as needed. The removable medium 41 can also store various kinds of data stored in the storage unit 29, similarly to the storage unit 29.

Figure 3:
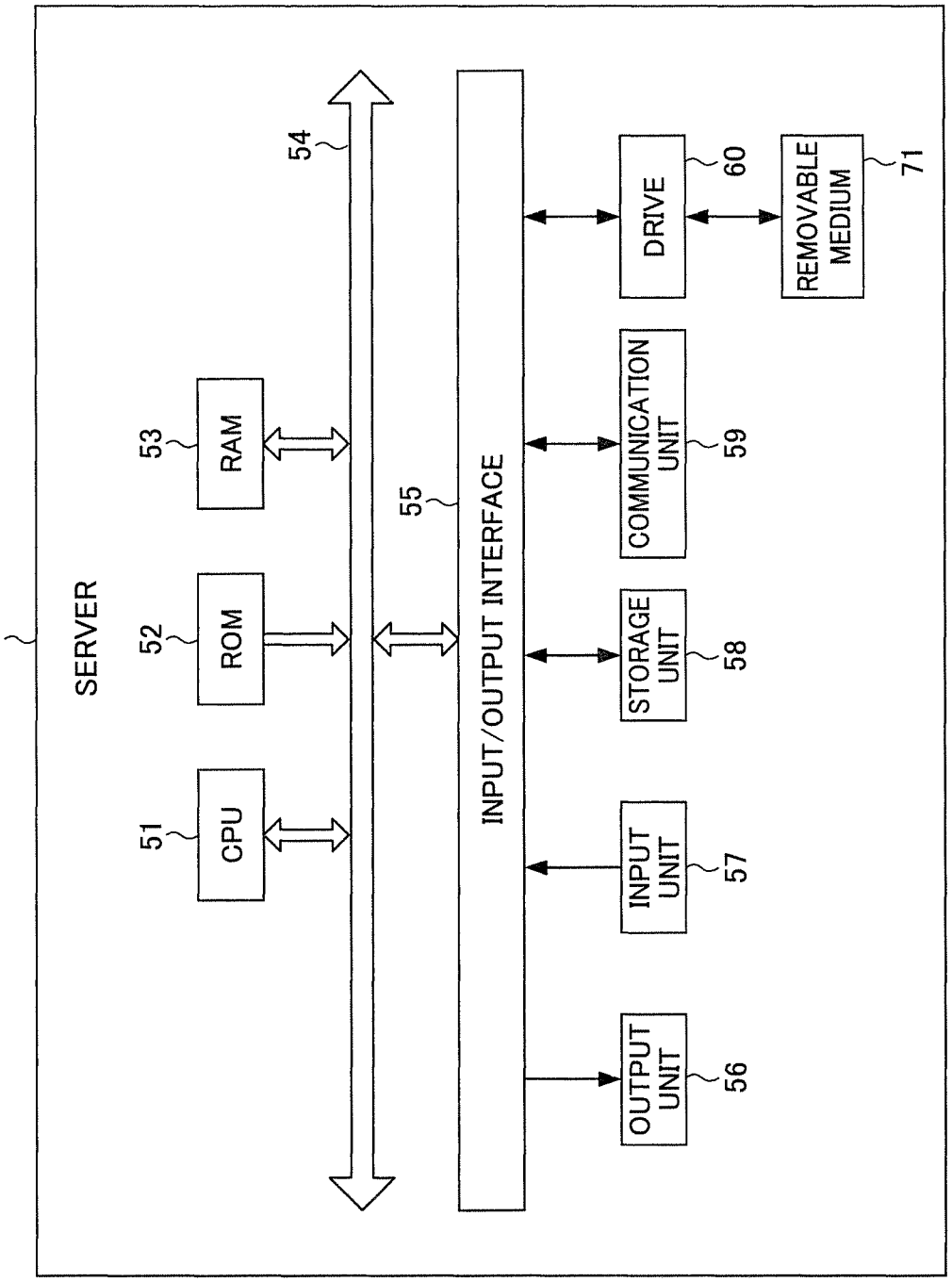
FIG. 3 is a block diagram showing, in the information processing system in FIG. 1, the hardware configuration of a server according to an embodiment of the present invention.

FIG. 3 is a block diagram showing, in the information processing system in FIG. 1, the hardware configuration of the server 2 according to an embodiment of the present invention.

The server 2 includes a CPU 51, a ROM 52, a RAM 53, a bus 54, an input/output interface 55, an output unit 56, an input unit 57, a storage unit 58, a communication unit 59, and a drive 60. Since the configuration of the server 2 is basically the same as that of the player terminal 1 with the touchscreen thereof removed, a description thereof will be omitted here.

Figure 4:
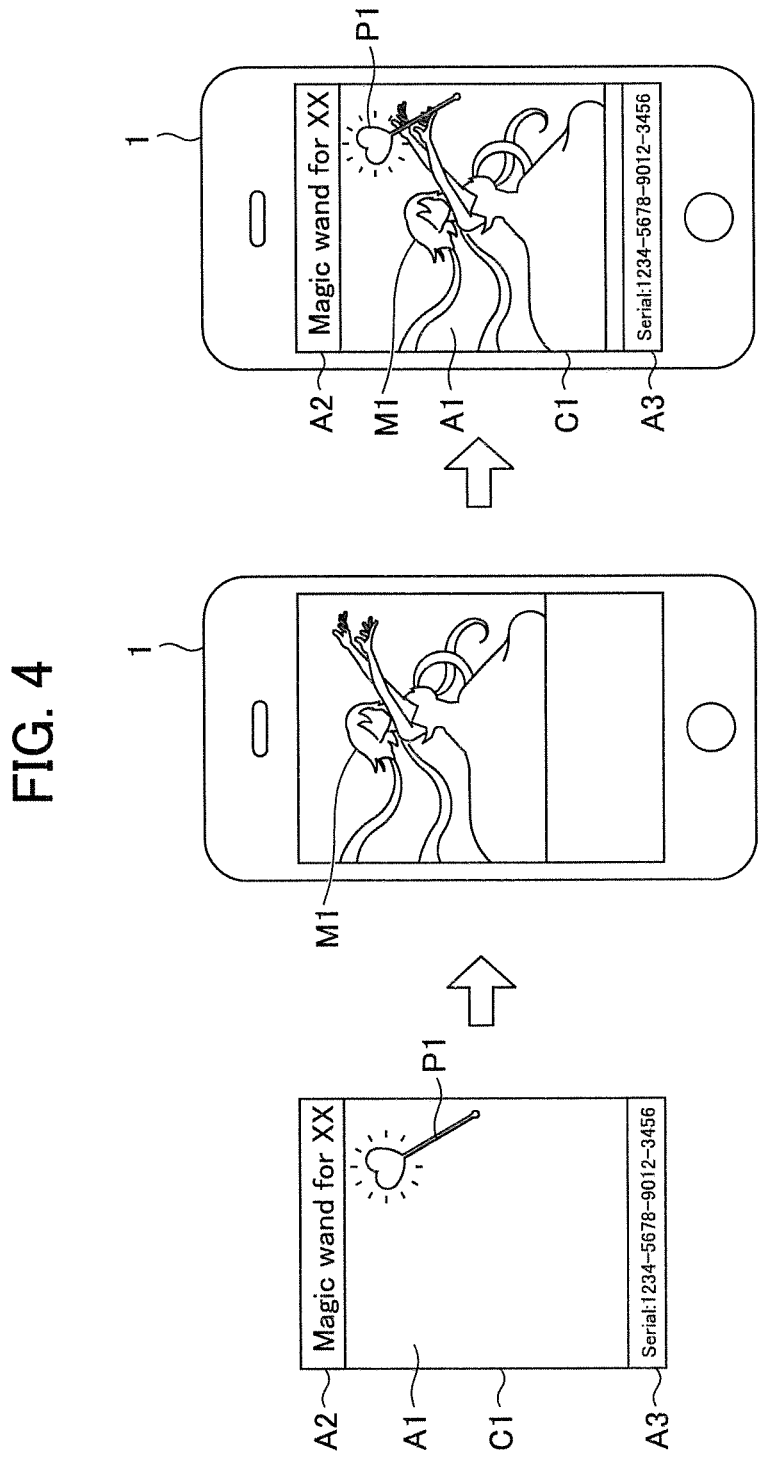
FIG. 4 is a schematic illustration for explaining a specific example of a card event using a card in the information processing system in FIG. 1.
Figure 5:
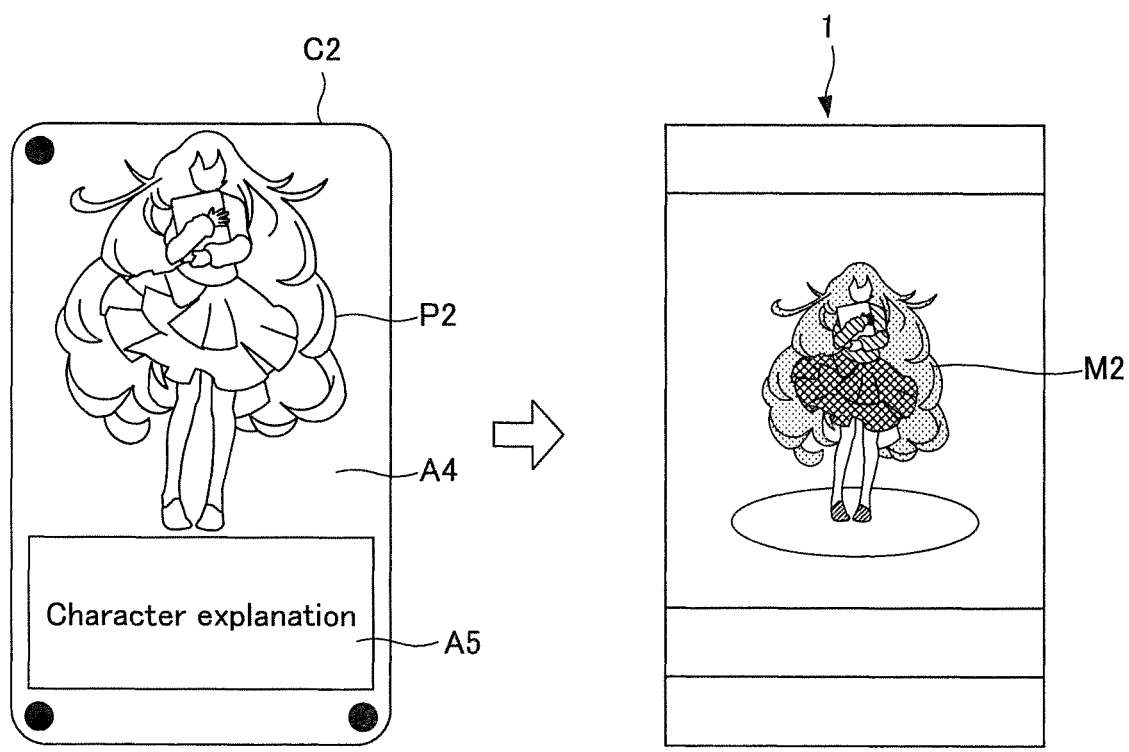
FIG. 5 is a schematic illustration for explaining a specific example of a card event using a card in the information processing system in FIG. 1, which is different from the example in FIG. 4.

Through cooperation between the various kinds of hardware and various kinds of software of the player terminal 1 in FIG. 2 and the server 2 in FIG. 3, it becomes possible to execute a game on the player terminal 1 and to realize card events using the cards C in the game, such as those in FIGS. 4 and 5.

FIG. 4 is a schematic illustration for explaining a card event using the card C1. As shown on the left side in FIG. 4, the card C1 has a transparent area A1 and opaque areas A2 and A3. The size and shape of the card C1 is not particularly limited as long as the size and shape fit such that the card C1 can be placed on the touchscreen of the player terminal 1. In this embodiment, a rectangular shape of the so-called business card size (credit card size) is adopted. Although there is no need to standardize the sizes and shapes of the cards C, it is assumed that not just the card C1 but all the cards C are standardized to have a rectangular shape of the business card size in this embodiment. Here, of the faces of the card C1, the face placed on the touchscreen (display surface) of the player terminal 1 will be referred to as the "bottom face", and the opposite face (the face shown in FIG. 4) will be referred to as the "top face". That is, in the case where the card C1 is placed on the touchscreen of the player terminal 1, the top face of the card C1 is viewed by the player. In this embodiment, it is assumed that the same relationship between the top face and the bottom face applies not just to the card C1 but to all the cards C.

On the top face of the transparent area A1 of the card C1, an object P1 used in the card event for the card C1 is shown opaquely. In the example in FIG. 4, as an image that is displayed on the player terminal 1 at the time of the card event (hereinafter referred to as a "relevant image"), an image of a character M1 named "XX" is adopted. The character M1 is a witch and can use a magic wand as an owned item. The object P1 representing the kind of magic wand is shown opaquely in the transparent area A1 on the top face of the card C1. It is assumed that the card event for the card C1 involves a presentational effect that looks as if the character M1 present in the virtual space in the game discovered the object P1 in the real world, reached out her hands from the virtual space in the game to the real world, and obtained the object P1 in the real world as a magic wand used in the virtual space in the game. A description of the object P1, i.e., a character string "Magic wand for XX", is shown in the opaque area A2 on the top face of the card C1. Furthermore, a serial number assigned to the card C1 itself at the time of shipping is shown in the opaque area A3 on the top face of the card C1.

Here, in order to realize the card event described above, in the case where the card C1 is placed on the display surface of the player terminal 1, the character M1 (to be precise, the CPU 21 that controls display of the relevant image of the character M1) needs to recognize the nature of the object P1 and to recognize the position and orientation of placement of the object P1.

The nature of the object P1 can be recognized by identifying the kind of the card C1 showing the object P1. In other words, the kind of the card C1 indicates the kind showing the object P1. Furthermore, the position and orientation of placement of the object P1 can be recognized from the position and orientation of the card C1 relative to the display surface in the case where the card C1 is placed on the display surface of the player terminal 1. That is, in order to realize the card event described above, the CPU 21 needs to recognize the kind of the card C1 and the position and orientation of the card C1 relative to the display surface in the case where the card C1 is placed on the display surface of the touchscreen.

Thus, in this embodiment, in order to enable such recognition, a plurality of contact points that can be detected by the touchscreen (to be precise, the touch-operation input unit 26 in FIG. 2) are provided on the same face of the card C1. Here, the same face is either the top face or the bottom face and is assumed to be the bottom face for convenience in the following explanation. In the example in FIG. 4, for convenience of explanation, the plurality of contact points are not shown. A specific example of the plurality of contact points will be described later with reference to FIGS. 7 to 10, etc.

As described above, the card C1 has a "feature" based on the layout of at least some of the plurality of contact points. In other words, at least some of the plurality of contact points are formed on the same face of the card C1 in a layout having such a "feature". Here, the reason for the description "at least some of" is that there is not necessarily a need to use all of the plurality of contact points in order to form a "feature". What is meant by a "feature" here is a unique feature that is formed for each of the kinds of the plurality of cards C. That is, the "feature" of the card C1 of a predetermined kind differs from the "feature" of a card C of another kind (e.g., the card C2, described later and shown in FIG. 5). The "feature" of the card C1 enables recognition of the kind, position, and orientation of the card C1. A specific example of the "feature" of a card C and a specific example of a method of recognizing the kind, position, and orientation of the card C on the basis of the "feature" will be described later with reference to FIGS. 7 to 10.

As shown in FIG. 4, in a state where the character M1 is displayed on the display surface of the player terminal 1 (see the middle illustration in the figure), the player places the card C1 (the left illustration in the figure) on the display surface (touchscreen) of the player terminal 1. Then, the touchscreen (to be precise, the touch-operation input unit 26 in FIG. 2) of the player terminal 1 simultaneously detects the plurality of contact points formed on the bottom face of the card C1. The player terminal 1 recognizes the "feature" of the card C1 on the basis of the result of detection and recognizes the kind of the card C1 and the position and orientation of the card C1 relative to the display surface on the basis of the "feature". From these results of recognition, the player terminal 1 recognizes that the object P1 is a magic wand for exclusive use by the character M1 and also recognizes the position and orientation of placement of the object P1. Then, the player terminal 1 displays an animation (relevant image) showing a process that looks as if the character M1 present in the virtual space in the game discovered the object P1 in the real world, reached out her hands from the virtual space in the game to the real world, and obtains the object P1 in the real world as a magic wand used in the virtual space in the game.

Here, since the area A1 of the card C1 is transparent, the player can view the opaque object P1 (magic wand) shown in the area A1 and the relevant image (animation) of the character M1 in such a manner as to be superimposed on each other (see the right illustration in FIG. 4). That is, the player can view the process that looks as if the character M1 in the virtual space in the game discovered the object P1 of the card C1 in the real world, reached out her hands to the real world, and obtained the object P1 as a magic wand used in the virtual space.

What should be noted here is that the position and orientation of placement of the card C1 on the player terminal 1 are not particularly limited. That is, there is no particular need for the player to accurately place the card C1 at a fixed position and fixed orientation on the player terminal 1. That is, the player is allowed to roughly place the card C1. Even in the case where the card C1 is roughly placed, as described above, the player terminal 1 can recognize the position and orientation of placement of the object P1 as long as a plurality of contact points identifying the "feature" of the card C1 are included on the display surface. Thus, the player terminal 1 can display, on the basis of the result of recognition, the relevant image (animation) in which the size, position, orientation, etc. of the character M1 are changed as appropriate. Furthermore, by recognizing the position and orientation of placement of the object P1 in real time, even if the card C1 (the object P1) is moved after being placed, the player terminal 1 can display the relevant image (animation) in which the size, position, orientation, etc. of the character M1 are changed as appropriate in accordance with the position and orientation after the movement. That is, it becomes possible to realize a presentational effect involving a process in which the character M1 discovers and reaches out for an item (the object P1) and obtains the item, regardless of the position and orientation of placement of the object P1.

FIG. 5 is a schematic illustration for explaining a specific example of a card event using a card C2, which is different from the example in FIG. 4. As shown on the left side in FIG. 5, the card C2 has a transparent area A4 and an opaque area A5. On the top face of the transparent area A4 of the card C2, an object P2 used in the card event for the card C2 is shown opaquely. In the example in FIG. 2, an image in which a character M2 is summoned is adopted as a relevant image used when a card event occurs. That is, the character M2 acts in the virtual space of the game but is absent in the virtual space before the card C2 is placed on the player terminal 1. An object P2 corresponding to the character M2 is shown in the transparent area A4 of the card C2 only by the outline thereof in black lines (opaque lines). It is assumed that the card event for the card C2 involves a presentational effect in which colors are added to the drawing of the object P2 in the real world and then the character M2 is summoned into the virtual space. A description of the object P2 described above, i.e., the description of the character M2 that is summoned, is shown in the opaque area A5 on the top face of the card C2.

The player places the card C2 (the left illustration in the figure) on the display surface (touchscreen) of the player terminal 1 in a state where a predetermined image (e.g., an image showing a place where the character is summoned) is displayed on the display surface of the player terminal 1. Then, the touchscreen (to be precise, the touch-operation input unit 26 in FIG. 2) of the player terminal 1 simultaneously detects the plurality of contact points formed on the bottom face of the card C2. The player terminal 1 recognizes the "feature" of the card C2 on the basis of the result of detection and recognizes the kind of the card C2 and the position and orientation of the card C2 relative to the display surface on the basis of the "feature". From the result of recognition, the player terminal 1 recognizes that the object P2 corresponds to the character M2 to be summoned and also recognizes the position and orientation of placement of the object P2. Then, the player terminal 1 displays an animation (relevant image) showing a presentational effect in which colors are added to the positions in the virtual space corresponding to the drawing of the object P2 in the real world (the corresponding pixels on the display surface) and the character M2 in the complete state is summoned after coloring is completed (see the right illustration in FIG. 5).

Here, the area A4 of the card C2 is a transparent area. Thus, the player can view a process in which the corresponding positions in the virtual space are gradually colored following the drawing of the object P2 in the real world (the opaque portion). Furthermore, the player can finally view a process in which the character M2 corresponding to the object P2 shown on the card C2 in the real world is summoned in the virtual space (see the right illustration in FIG. 5). That is, it appears to the player as if the character M2 in the virtual world in the game were summoned via the object P2 of the card C2 in the real world.

Similarly to the card C1, what should be noted here is that the position and orientation of placement of the card C2 on the player terminal 1 is not particularly limited. That is, there is no particular need for the player to accurately place the card C2 at a fixed position and fixed orientation on the player terminal 1. That is, the player is allowed to roughly place the card C2. Even in such cases, the player terminal 1 can recognize the position and orientation of placement of the object P2 as long as a plurality of contact points identifying the "feature" of the card C2 are included on the display surface. Thus, the player terminal 1 can display, on the basis of the result of recognition, the relevant image (animation) in which the size, position, orientation, etc. of the character M2 are changed as appropriate (including the states in the middle of coloration). Furthermore, by recognizing the position and orientation of placement of the object P2 in real time, even if the card C2 (the object P2) is moved after being placed, it is possible to display the relevant image (animation) in which the size, position, orientation, etc. of the character M2 are changed as appropriate (including the period of coloration) in accordance with the position and orientation after the movement. That is, it becomes possible to realize a presentational effect involving a process in which colors are gradually added following the drawing of the object P2 and the character M2 corresponding to the object P2 is summoned, regardless of the position and orientation of placement of the object P2.

The black circles shown at the top left, bottom left, and bottom right on the card C2 shown on the left side in FIG.

5 are some of the plurality of contact points (reference points, which will be described later) provided on the bottom face of the card C2. Since it is assumed in this description that the touchscreen (the touch-operation input unit 26) adopts the capacitive detecting method, for example, conductive rubber points are adopted as the plurality of contact points, as will be described later in detail. Since the conductive rubber points have a color, such as black, and are thus seen by the player when provided on the bottom face of the transparent area A4. Thus, for example, it is preferable from the viewpoint of design to provide all of the plurality of contact points in a form wherein they are concentrated on the bottom face of the opaque area A5 since the contact points disappear from the field of view of the player. Furthermore, although not shown, other information, such as a serial number, may be shown in the opaque area A5 on the top face of the card C2.

Figure 6:
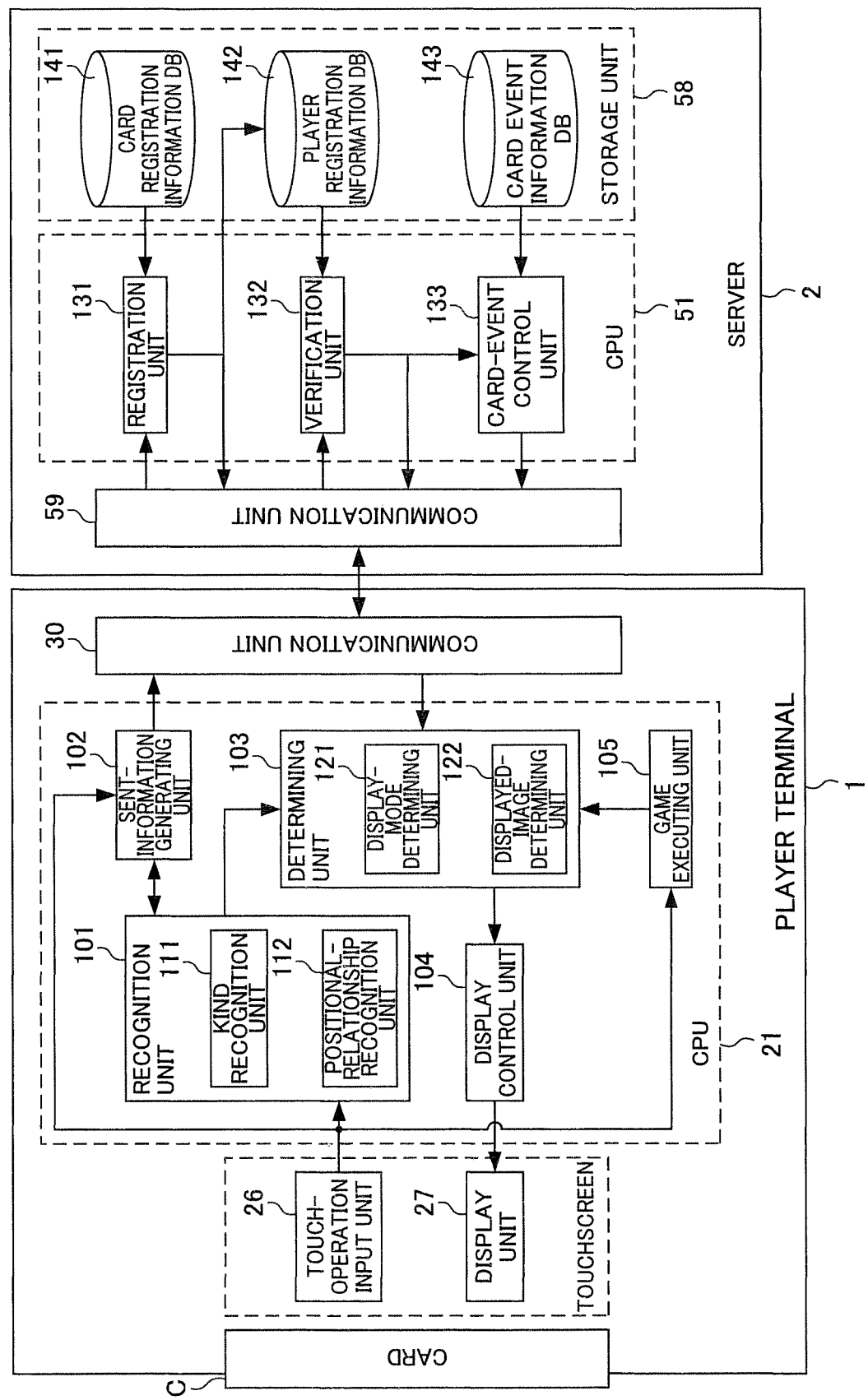
FIG. 6 is a functional block diagram showing an example of the functional configurations of the player terminal in FIG. 2 and the server in FIG. 3.

As described above with reference to FIGS. 4 and 5, the information processing system according to this embodiment makes it possible to realize card events in which the cards C in the real world are coordinated seamlessly with the game in the virtual world. Specifically, there have hitherto been games utilizing AR, in which images are combined in the display screen. In contrast, the combining technology used in this embodiment involves combining that is the inverse of AR, i.e., a technology for optically combining images in the real world. Thus, such combining technology will be referred to as "inverse AR (inverse augmented reality)". In a card event utilizing such "inverse AR", it is possible to realize, for example, a presentational effect that looks as if a character, etc. in the virtual space recognized and responded to movement of a card C in the real world in real time. FIG. 6 shows an example of the functional configuration of an information processing system that makes it possible to realize card events utilizing such "inverse AR". Thus, an example of the functional configurations of the player terminal 1 in FIG. 2 and the server 2 in FIG. 3 will be described below with reference to FIG. 6.

In order to make it possible to realize card events utilizing "inverse AR", in the CPU 21 of the player terminal 1, a recognition unit 101, a sent-information generating unit 102, a determining unit 103, and a display control unit 104 function. In the recognition unit 101, a kind recognition unit 111 and a positional-relationship recognition unit 112 function. In the determining unit, a display-mode determining unit 121 and a displayed-image determining unit 122 function.

In order to make it possible to realize card events utilizing "inverse AR", in the CPU 51 of the server 2, a registration unit 131, a verification unit 132, and a card-event control unit 133 function. Furthermore, in areas of the storage unit 58 of the server 2, a card registration information database 141, a player registration information database 142, and a card event information database 143 are provided.

When a card C is placed on the display surface (touchscreen) of the player terminal 1, touch operations are performed simultaneously with the individual contact points provided on the bottom face of the card C. Such multiple touch operations, i.e., a multi-touch, are detected by the touch-operation input unit 26.

On the basis of the result of detection of the multi-touch by the touch-operation input unit 26, the recognition unit 101 recognizes the kind of the card C and the position and orientation of the card C relative to the display surface. Specifically, in this embodiment, the card C of each kind has a "feature" based on the layout of at least some of the plurality of contact points, as described earlier. Thus, the recognition unit 101 recognizes the "feature" on the basis of the layout of at least some of the plurality of contact points detected by the touch-operation input unit 26 and recognizes the kind of the card C and the position and orientation of the card C by using the "feature".

Since the plurality of contact points provided on the card C need to be detected by the touch-operation input unit 26, as described above, the material, shape, etc. thereof are chosen in accordance with the detecting method of the touch-operation input unit 26. For example, in the case where the resistive (pressure-sensitive) detecting method is adopted, protrusions suffice as contact points; however, the capacitive detecting method is adopted in this example, as described earlier. Thus, it is suitable to adopt contact points formed of a material having electrostatic conductivity as the plurality of contact points. Specifically, for example, conductive rubber points may be adopted as the plurality of contact points. When conductive contact points are brought into contact with or in proximity to the touch-operation input unit 26, similarly to a touch operation with a finger or the like, the electrostatic capacitance that occurs between the electrodes of the touch-operation input unit 26 changes, whereby the touched position of the contact point is detected. If the individual contact points are laid out separately, the individual touched positions of the plurality of contact points are detected simultaneously. A multi-touch using the plurality of contact points is realized in this manner.

As the "feature" of the card C, represented by the layout of the plurality of contact points, there exist a "first feature" that enables identification of a position and orientation of the card C relative to the display surface and a "second feature" that enables identification of a kind of the card C. That is, the kind recognition unit 111 of the recognition unit 101 recognizes the "second feature" on the basis of the layout of at least some of the plurality of contact points of the card C and recognizes the kind of the card C by using the "second feature". On the other hand, the positional-relationship recognition unit 112 of the recognition unit 101 recognizes the "first feature" on the basis of the layout of at least some of the plurality of contact points of the card C and recognizes the position and orientation of the card C by using the "first feature".

Now, a specific example of the "first feature" and a method of recognizing the position and direction of a card C by using the "first feature" will be described with reference to FIGS. 7 and 8. Then, a specific example of the "second feature" and a method of recognizing the kind of a card C by using the "second feature" will be described with reference to FIGS. 9 and 10.

Figure 7:
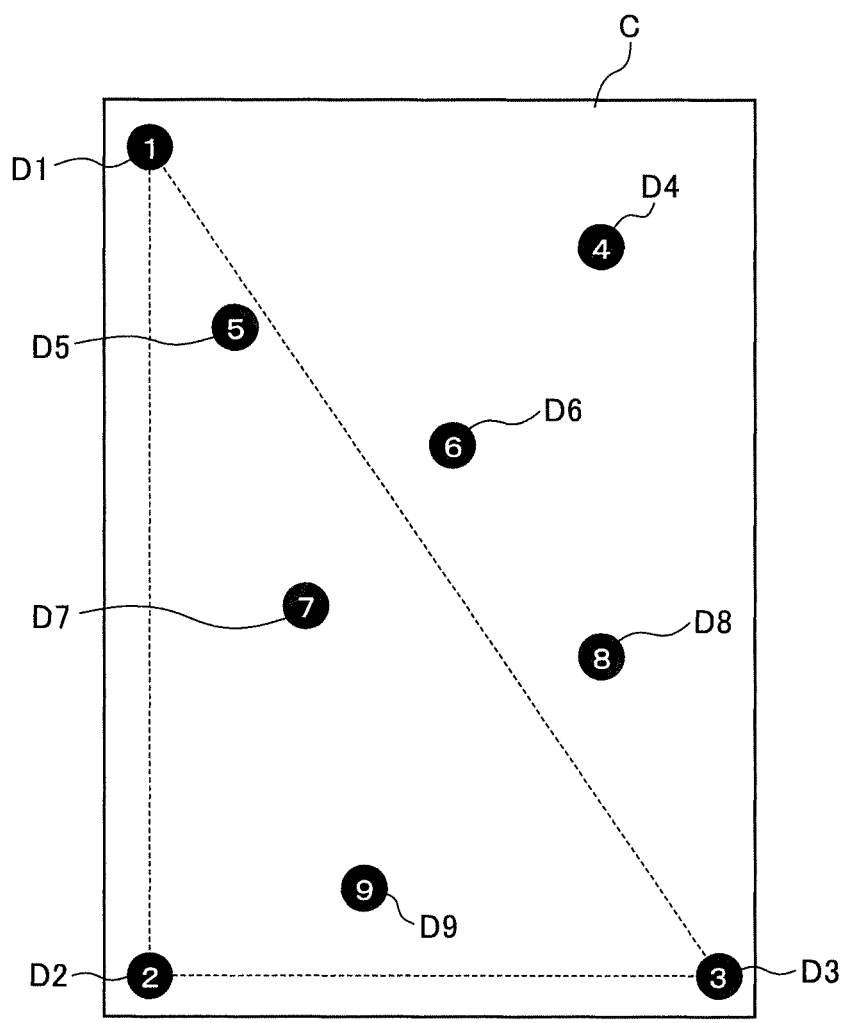
FIG. 7 is an illustration showing an example of the layout of a plurality of contact points on a card, which serves to explain an example of a method of recognizing the position and orientation of a card.

FIG. 7 is an illustration showing an example of the layout of a plurality of contact points, which serves to explain an example of a method of recognizing the position and orientation of a card C.

In this embodiment, nine contact points D1 to D9 are laid out on the bottom face of each card C. Here, as the number of contact points, any number may be adopted within a range not exceeding the number of touched positions that can be detected on the touchscreen (the touch-operation input unit 26). Here, since the touch-operation input unit 26 that is adopted supports 10-point multi-touch, as described earlier, an arbitrary number of contact points not exceeding ten can be laid out on the card C. That is, in the case of 10-point multi-touch, it is possible to lay out a maximum of ten contact points on the card C. In this embodiment, however, nine contact points D1 to D9 are laid out. This is because, by not using the ability of detection at the remaining one touched position, it becomes possible to detect whether a touch operation is being performed with a player's finger or the like and to determine whether an error has occurred on the basis of the result of detection. Furthermore, the number of contact points may be eight or fewer. In this case, however, the bit length of codes representing the kinds of cards C decreases, which results in a decrease in the number of kinds of cards C. For these reasons, nine contact points are preferable with 10-point multi-touch.

As the "first feature" for recognizing the position and orientation of a card C, it is possible to adopt a positional relationship among the contact points individually placed at three predetermined vertices of the four vertices of the minimum bounding rectangle (MBR) identified from the plurality of contact points attached to the card C. That is, in the example in FIG. 7, of the minimum bounding rectangle identified from the nine contact points D1 to D9, a positional relationship among the contact point D1 laid out at the top left vertex, the contact point D2 laid out at the bottom left vertex, and the contact point D3 laid out at the bottom right vertex (the position and orientation of the triangle formed by the dotted line in the figure) is adopted as the "first feature". Here, the contact points D1 to D3 laid out at the three vertices of the minimum bounding rectangle will hereinafter be referred to as "reference points". Since the position and orientation of the triangle formed by the dotted line in the figure are fixed by the contact points D1 to D3 serving as reference points, it becomes possible to recognize the orientation and position of the card C placed on the display surface of the player terminal 1, regardless of the orientation and position. Without particular limitation to the example in FIG. 7, it suffices for the positions where the contact points D1 to D3 serving as references are laid out to be three arbitrary vertices among the four vertices of the minimum bounding rectangle.

Figure 8:
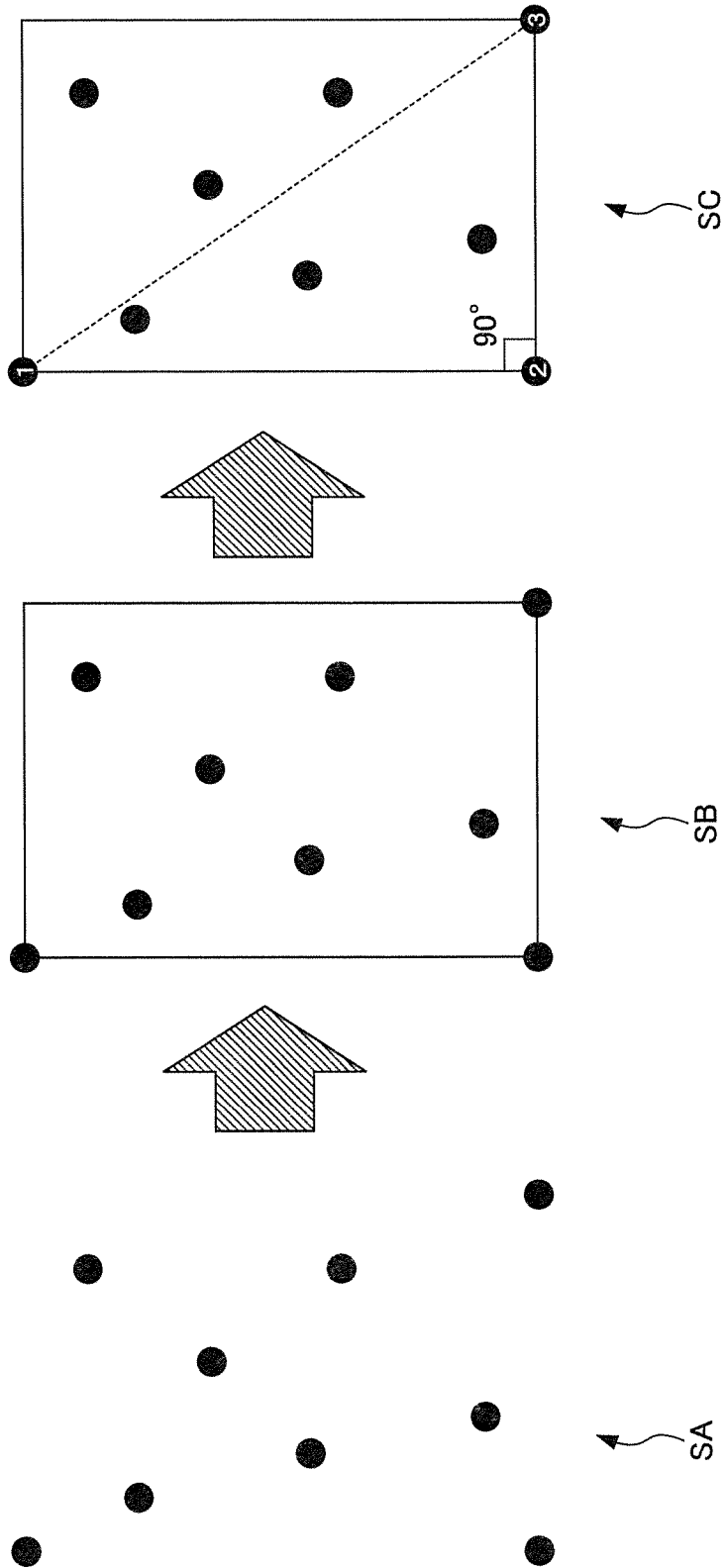
FIG. 8 is a schematic illustration for explaining an example of the flow of processing in the method of recognizing the position and orientation of a card.

FIG. 8 is a schematic illustration for explaining an example of the flow of processing for a method of recognizing the position and orientation of a card C.

When a card C is placed on the display surface (the touch-operation input unit 26) of the player terminal 1, the nine contact points thereof (the contact points D1 to D9 in the example in FIG. 7) are brought into contact with or in proximity to the display surface. Then, in step SA, the touch-operation input unit 26 detects a 9-point multi-touch event on the basis of changes in electrostatic capacitance. That is, the individual touched positions of the nine contact points (the contact points D1 to D9 in the example in FIG. 7) are detected simultaneously and are supplied to the recognition unit 101.

In step SB, the positional-relationship recognition unit 112 of the recognition unit 101 extracts the minimum bounding rectangle from the nine contact points (the contact points D1 to D9 in the example in FIG. 7). Then, the positional-relationship recognition unit 112 sets the individual contact points (the contact points D1 to D3 in FIG. 7) laid out at the three vertices of the minimum bounding rectangle as reference points. Although not shown, in the case where the positional-relationship recognition unit 112 recognizes that the contact points are laid out at all the four vertices of the minimum bounding rectangle, the positional-relationship recognition unit 112 executes predetermined error processing since it is difficult to recognize the position and orientation of the card C.

Here, in this embodiment, for the purpose of recognition of the kinds of cards C, which will be described later, unique numbers are assigned individually to the nine contact points. In the example in FIG. 7, the value following reference sign D represents the assigned number. That is, the number of a contact point Dk (k is an arbitrary integer from 1 to 9) is "k". Although the rules for assigning numbers to contact points Dk are not particularly limited, the rules are defined as follows in the example in FIG. 7. Specifically, numbers are individually assigned to the three contact points D1 to D3 serving as reference points, as follows. First, a number "1" is assigned to the contact point laid out at a vertex not touching the shortest line segment among the line segments interconnecting the three vertices at which the reference points of the minimum bounding rectangle are laid out, i.e., to the contact point D1 in the example in FIG. 7. Next, a number "2" is assigned to the contact point laid out at a vertex touching the shortest line segment among the line segments interconnecting the three vertices and touching a right angle, i.e., to the contact point D2 in the example in FIG. 7. Then, a number "3" is assigned to the contact point laid out at a vertex touching the shortest line segment among the line segments interconnecting the three vertices and touching a non-right angle, i.e., to the contact point D3 in the example in FIG. 7.

In other words, in step SC in FIG. 8, the positional-relationship recognition unit 112 sequentially recognizes the individual numbers "1" to "3" individually for the three reference points (the contact points D1 to D3 in the example in FIG. 7) according to the rules described above. Then, the positional-relationship recognition unit 112 recognizes the orientation and position of the card C placed on the display surface of the player terminal 1 on the basis of the contact point number "1" (the contact point D1 in the example in FIG. 7), the contact point number "2" (the contact point D2 in the example in FIG. 7), and the contact point number "3" (the contact point D3 in the example in FIG. 7).

For the six contact points (the contact points D4 to D9 in the example in FIG. 7) other than the reference points, for example, numbers are assigned as follows. Specifically, numbers are assigned sequentially in ascending order of distances from the top left reference point (the contact point D1 in the example in FIG. 7) and distances from the bottom left reference point (the contact point D2 in the example in FIG. 7). That is, after recognizing the numbers of the reference points (the contact points D1 to D3 in the example in FIG. 7) described above, the positional-relationship recognition unit 112 sequentially recognizes the numbers "4" to "9" individually for the remaining six contact points (the contact points D4 to D9 in the example in FIG. 7) according to the rules described above.

As already mentioned, the rules for assigning numbers to the individual contact points, described above, are only examples. That is, arbitrary rules may be adopted as long as a unique number is assigned to each single contact point and the individual number can be recognized on the basis of a positional relationship among the nine contact points according to the rules.

Figure 9:
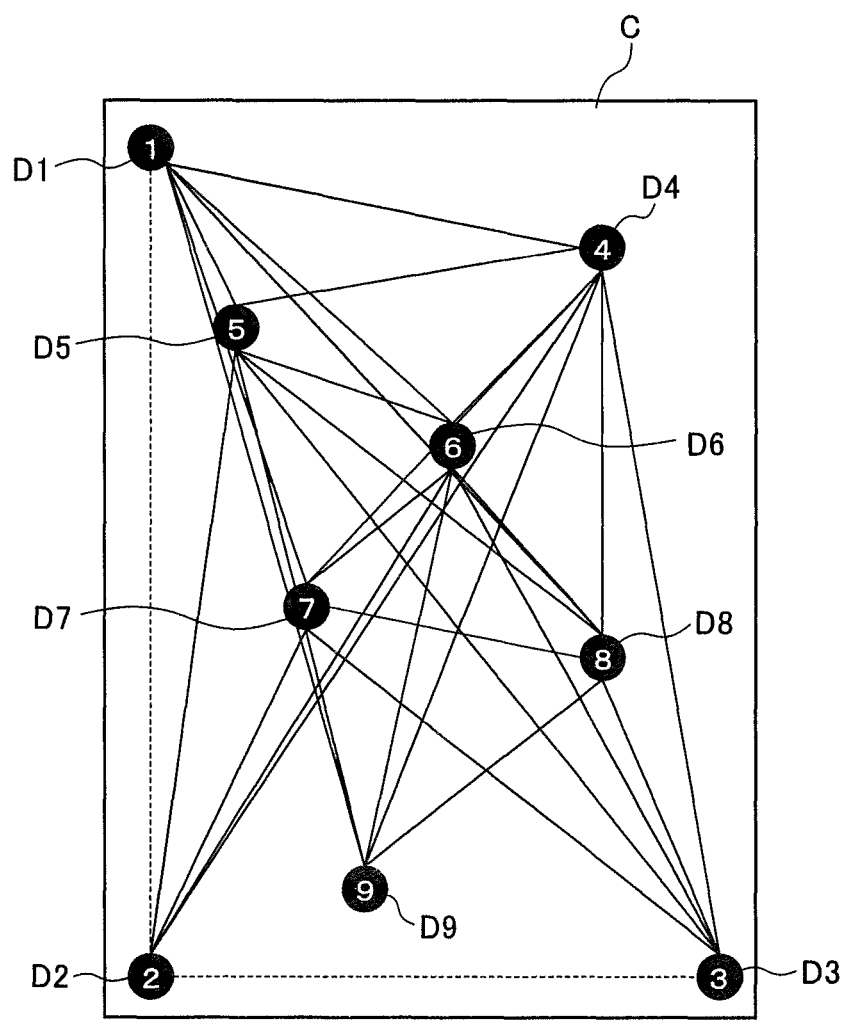
FIG. 9 is an illustration showing an example of the layout of a plurality of contact points on a card, which serves to explain an example of a method of recognizing the kind of card.

After the numbers of the individual contact points (the contact points D1 to D9 in the example in FIG. 7) are recognized by the positional-relationship recognition unit 112 as described above, the "second feature" for recognizing the kind of the card C is recognized, as shown in FIG. 9. FIG. 9 is an illustration showing an example of the layout of a plurality of contact points on a card C, which serves to explain an example of a method of recognizing the kind of a card C.

As the "second feature" for recognizing the kind of a card C, it is possible to adopt feature values based on line segments interconnecting two predetermined contact points attached to the card C. In this case, it is assumed that the card C is associated in advance with a code represented by a combination of a plurality of feature values based on a predetermined rule. That is, in this case, the kind of the card C is represented by a code. In the example in FIG. 9, there are 33 line segments between two arbitrary contact points among the nine contact points D1 to D9, except for line segments between two reference points. The lengths of the 33 line segments are adopted as feature values for the "second feature". A code in which discretized values of these 33 feature values are arrayed in a predetermined order is adopted as the kind of the card C. Here, the method of discretizing the feature values (the lengths of line segments) is not particularly limited. For example, in the case where the simplest binarization method is adopted, in which one predetermined threshold is used and "long (1)" is set if the length exceeds the threshold and "short (0)" is set if the length does not exceed the threshold, the length of the code representing the kind of the card C is 33 bits. That is, the number of variations of cards C is $2^{33}$, which is about 8.6 billion. Furthermore, in the case where the ternarization method is adopted, in which two predetermined thresholds are used to classify the feature values (the lengths of line segments) into three values, namely, "long", "intermediate", and "short", the number of codes representing the kinds of cards C increases to $3^{33}$.

It is to be noted that there are mutual dependencies among the line segments: for example, there are cases where, in order to make a line segment longer, it is necessary to also make another line segment longer. Thus, it is very difficult to control the lengths of all the line segments independently. For this reason, even if the binarization method is actually adopted, it is difficult to adopt all of the about 8.6 billion combinations as codes representing the kinds of cards C. However, as opposed to serial numbers for individually identifying physical cards C, it suffices for codes representing the kinds of cards C to enable identification of the kinds of cards C (the kinds of objects (graphics) shown on cards C), as the name suggests. Here, it is assumed that a number on the order of thousands to tens of thousands suffices as the number of the kinds of objects (graphics) used in a game. Therefore, it is not particularly a problem even if it is not possible to adopt all of the about 8.6 billion combinations.

FIG. 10 is a chart showing an example of a method of generating a code representing the kind of a card C. In the table in FIG. 10, a certain row indicates an index on a bit array, corresponding to the identifier of a certain line segment. That is, the code representing the kind of a card C is constituted of an array of 33 bits. The table in FIG. 10 shows the association between each index on the bit array and the identifier of a certain line segment. In the example in FIG. 10, the binarization method (represented by a bit value of either "0" or "1") is adopted as the method of discretizing feature values (the lengths of line segments). The "start number" of a certain row is the number of the contact point laid out at one end of the line segment corresponding to that row. The "end number" of the certain row is the number of the contact point laid out at the other end of the line segment corresponding to that row. That is, (start number, end number) for the certain row is the identifier of the line segment corresponding to that row. For example, in the case where an identifier (1, 5) is given, the positional-relationship recognition unit 112 can uniquely identify it as representing "the line segment interconnecting the contact point number 1 D1 and the contact point number 5 D5", i.e., as corresponding to the second row from the top in FIG. 10. Then, by searching the "bit array index" on the second row, the positional-relationship recognition unit 112 can identify the identifier as representing the line segment corresponding to the position of the index (the order of the digit) "1" in the code representing the kind of the card C. That is, the positional-relationship recognition unit 112 is provided in advance with the relationship in the table in FIG. 10 and, for example, obtains the length (feature value) of the line segment interconnecting the contact point number 1 D1 and the contact point number 5 D5 and identifies the binarized value thereof as the bit value at the position of the index (the order of the digit) "1". Through iterations of such processing for the individual 33 line segments, the positional-relationship recognition unit 112 can recognize the 33-bit code as a code representing the kind of the card C.

Referring back to FIG. 6, when the card C is placed on the display surface (the touch-operation input unit 26), the touch-operation input unit 26 detects the touched positions of the nine contact points (the contact points D1 to D9 in the above-described examples in FIGS. 7 and 9, etc.). Then, the kind recognition unit 111 recognizes a code representing the kind of the card C, and the positional-relationship recognition unit 112 recognizes the position and orientation of the card C relative to the display surface.

Here, as shown in FIGS. 4 and 5, in order to invoke a card event for the card C, what needs to be associated with a relevant image (an image of a character or the like) to be displayed on the display unit 27 is not the card C itself but the object (an item belonging to a character, a character to be summoned, or the like) shown on the card C. Thus, even if the player terminal 1 can recognize the code representing the kind of the card C, the player terminal 1 cannot recognize an object to be associated with the relevant image from the code alone. Furthermore, there may be cases where the player terminal 1 cannot recognize a relevant image to be used in the card event for the card C. That is, in order to invoke a card event for the card C, it is necessary to obtain information that enables identification of the object shown on the card C, a relevant image to be used in the card event for the card C, the relationship between the relevant image and the object, etc. Such information will hereinafter be referred to as "card event information". In other words, of the information relating to the object (graphic) shown on the card C, card information is information that serves as an aid in processing for determining a relevant image and determining a size, position, and orientation for displaying the relevant image on the display surface. That is, in order to invoke a card event for the card C, the player terminal 1 needs to obtain card event information on the basis of the code representing the kind of the card C. Specifically, it is necessary to associate codes representing the kinds of cards C with card event information in advance. In this embodiment, associations between codes representing the kinds of cards C and card event information are managed in the server 2.

Thus, the sent-information generating unit 102 generates sent information including the code representing the kind of the card C and sends the sent information to the server 2 via the communication unit 30. As will be described later in detail, upon receiving the sent information from the player terminal 1, the server 2 recognizes the code representing the kind of the card C from the sent information. The server 2 extracts card event information corresponding to the recognized code. The server 2 sends the card event information to the player terminal 1. The determining unit 103 of the player terminal 1 receives the card event information via the communication unit 30. Furthermore, since the position and orientation of placement of the card C may change in the meantime, the positional-relationship recognition unit 112 recognizes the position and orientation of placement of the card C in real time and notifies the determining unit 103 when needed. Then, on the basis of the card event information and the position and orientation of placement of the card C, received from the server 2, the determining unit 103 determines a relevant image to be displayed on the display surface and a size, position, and orientation for displaying the relevant image on the display surface. Here, parameters related to display of the relevant image when the relevant image is displayed on the display surface, such as the size, position, and orientation thereof, will hereinafter be collectively referred to as a "display mode". Specifically, the relevant image is determined by the displayed-image determining unit 122, and the display mode of the relevant image is determined by the display-mode determining unit 121.

Now, an example of a method of determining a display mode of a relevant image will be described. In this embodiment, the display-mode determining unit 121 determines a position, angle, and size of the relevant image by using the position and orientation (angle) of the card C relative to the display surface and the size of the card C. The size of the card C can be easily calculated, for example, from the area of the triangle interconnecting the three reference points described earlier. Here, the relevant image for which a position, angle, and size are determined may be an image to be displayed on the entire display surface of the display unit 27 (e.g., an image including a character with a background, etc.) or a part of an image to be displayed on the entire display surface (e.g., an image of a character alone). The display-mode determining unit 121 uses, as a reference image, a relevant image that is displayed when no card C is placed on the display surface. The display-mode determining unit 121 generates an affine transformation matrix including, as elements thereof, parameters representing a magnification factor, an amount of movement, and an amount of rotation of the relevant image relative to the reference image. The affine transformation matrix is used to determine a size, position, and orientation for displaying the relevant image on the display surface.

That is, an affine transformation matrix is a matrix for executing coordinate transformation (affine transformation) in a two-dimensional space. Specifically, an affine transformation is a transformation of an image, such as enlargement/reduction, rotation, or translation, using a 3×3 matrix, and this matrix is an affine transformation matrix. For example, let the coordinates of a reference image (the coordinates before transformation) be signified by (x, y) and the coordinates of a relevant image after transformation, i.e., the coordinates matched with the card C, by (x' y'). In this case, the coordinates before transformation can be obtained from the coordinates after transformation according to equation (1) below. That is, the matrix in equation (1) is an inverse matrix of the affine transformation matrix.

[Eq. 1]

$$\begin{pmatrix} x \\ y \\ 1 \end{pmatrix} = \begin{pmatrix} a & b & c \\ d & e & f \\ 0 & 0 & 1 \end{pmatrix}^{-1} \begin{pmatrix} x' \\ y' \\ 1 \end{pmatrix} \quad (1)$$

The display control unit 104 exercises control to display the relevant image determined by the displayed-image determining unit 122 on the display unit 27 in the display mode determined by the display-mode determining unit 121. This realizes a card event in which the card C in the real world and the game in the virtual world (relevant image) are combined, as described with reference to FIGS. 4 and 5.

The game executing unit 105 executes the game including such a card event for the card C. The game executing unit 105 can execute arbitrary game actions, such as processing for responses by characters in accordance with the position and orientation of the card C, as well as the above-described display control of the relevant image by the display control unit 104.

The functional configuration of the server 2 will be described together in the description of processing executed by the information processing system with reference to the flowcharts in FIGS. 11 and 12. Next, an example of the flows of processing executed by the player terminal 1 and the server 2 having the functional configurations in FIG. 6 will be described with reference to flowcharts in FIGS. 11 and 12 as appropriate.

First, in order to experience a card event for a card C, described above, a player has to register himself or herself as an owner of the card C. Processing needed for this registration will hereinafter be referred to as "registration processing".

As a prerequisite for the registration processing, it is assumed that the card C itself is registered in advance in the server 2. The registration information of the card C is stored in the card registration information database 141. Specifically, for example, each card C has assigned thereto, at the time of production, a serial number and a code representing the kind of the card C. Furthermore, according to the arrangement and rules described earlier with reference to FIGS. 7 to 10, nine contact points (the contact points D1 to D9 in the examples in FIGS. 7 and 9, described earlier) are provided on the bottom face of the card C. Then, information in which the code representing the kind of the card C is associated with the serial number is registered in the card registration information database 141 as registration information of the card C.

Here, the serial number refers to a unique identifier assigned to each physical card C, which serves to identify the card C itself. Thus, for example, in the case where the number of cards C that are shipped is a hundred million, serial numbers have to allow representation of values of at least 0 to a hundred million.

On the other hand, the codes representing the kinds of cards C refer to codes that enable identification of the individual kinds of objects (graphics) shown on the cards C, as their name suggests. Thus, for example, it is ensured that different codes are assigned to the card C1 showing the object P1 in FIG. 4 and the card C2 showing the object P2 in FIG. 5 since the kinds of these objects differ. On the other hand, for example, in the case where ten thousand cards C showing the same kind of object P1, including the card C1 in FIG. 4, are shipped, the same code may be assigned to all the cards C as a code representing the kind of the cards C (the kind showing the object P1). As described above, it suffices for codes representing the kinds of cards C to have a representation ability that enables identification of objects (graphics) on the cards C, as opposed to serial numbers.

In this embodiment, for example, information expressed in equation (2) is used as registration information of each card C.

$$<[b1,b2,b3,\ldots,bn],SIR> \quad (2)$$

In equation (2), b1 to bn signify an n-bit (n=33 in the example described earlier) array for a code representing the kind of the card C. Furthermore, SIR signifies a serial number that enables physical identification of the single card C.

Under these presuppositions, registration processing shown in FIG. 11 is executed. Specifically, FIG. 11 is a flowchart for explaining the flows of registration processing executed by the player terminal 1 and the server 2.

In step S1, the sent-information generating unit 102 of the player terminal 1 generates sent information representing a card registration request and sends the sent information to the server 2 via the communication unit 30. It suffices for the sent information representing the card registration request to enable registration of the player at the server 2. In this embodiment, it is assumed that the sent information includes the serial number, the player ID, and the code representing the kind of the card C. It is assumed that the serial number and the player ID are entered by touch operations with a player's finger or the like. It is also assumed that the code representing the kind of the card C is recognized by the kind recognition unit 111 in a state where the card C is placed on the display surface (the touch-operation input unit 26).

In step S11, upon receiving the sent information representing the card registration request, the registration unit 131 of the server 2 verifies the validity of the card C. Specifically, the registration unit 131 verifies the validity of the card C by determining whether or not the combination of the serial number and the code representing the kind of the card C, included in the sent information, matches the registration information stored in the card registration information database 141.

In step S12, the registration unit 131 determines whether or not the card C is valid.

In the case where the card C is not valid, i.e., in the case where the combination of the serial number and the code representing the kind of the card C, included in the sent information, does not match the registration information stored in the card registration information database 141, the determination in step S12 results in NO, and the processing proceeds to step S14. In step S14, the registration unit 131 sends registration result information indicating that the card C is not valid to the player terminal 1 via the communication unit 59. Then, the registration processing at the server 2 is terminated. In step S2, the communication unit 30 of the player terminal 1 receives the registration result information. Then, the registration processing at the player terminal 1 is terminated. Although not shown, the registration result is presented to the player via the display unit 27 or in other forms. In this case, since the player is notified that the registration failed, the player can reattempt registration. That is, the registration processing at the player terminal 1 is started again.

On the other hand, in the case where the card C is valid, i.e., in the case where the combination of the serial number and the code representing the kind of the card C, included in the sent information, matches the registration information stored in the card registration information database 141, the determination in step S12 results in YES, and the processing proceeds to step S13.

In step S13, the registration unit 131 registers the card C as a card owned by the player having the player ID included in the sent information. Specifically, the registration unit 131 generates information in which the player ID included in the sent information is associated with the registration information of the card C (hereinafter referred to as "player registration information") and stores the player registration information in the player registration information database 142. In the player registration information database 142, for each player ID, player registration information about owned cards C is managed in an aggregated form. This makes it possible to readily manage the status of ownership of cards C for each player.

For example, in this embodiment, information expressed in equation (3) is used as player registration information.

$$<PID,[b1,b2,b3, \ldots ,bn],SIR> \quad (3)$$

In equation (3), PID signifies a player ID that enables unique identification of a player. b1 to bn signify an n-bit (n=33 in the example described earlier) array for a code representing the kind of the card C. Furthermore, SIR signifies a serial number that enables physical identification of the single card C.

By using the player registration information including the above association, when a player has entered the code representing the kind of a card C (actually, when the player has placed the card C on the display surface of the player terminal 1), it is possible to authenticate whether or not the player is an owner of the kind of card C.

In step S14, the registration unit 131 sends registration result information indicating that the card C is valid to the player terminal 1 via the communication unit 59. Then, the registration processing at the server 2 is terminated. In step S2, the communication unit 30 of the player terminal 1 receives the registration result information. Then, the registration processing at the player terminal 1 is terminated. Although not shown, the registration result is presented to the player via the display unit 27 or in other forms. In this case, since the player is notified of the successful registration of the card C, the player can invoke a card event using the card C at a certain timing in the subsequent course of playing the game.

Processing for invoking such a card event will hereinafter be referred to as "card event processing". Card event processing shown in FIG. 12 starts when triggered by a situation where a card C is placed on the display surface (the touch-operation input unit 26) of the player terminal 1 at a certain timing during the execution of the game and a multi-touch with the plurality of contact points provided on the card C is detected by the touch-operation input unit 26. FIG. 12 is a flowchart for explaining an example of the flows of card event processing executed by the player terminal 1 and the server 2.

In step S21, the recognition unit 101 of the player terminal 1 recognizes the code representing the kind of the card C and the position and orientation of the card C. In step S22, the sent-information generating unit 102 generates sent information including the code representing the kind of the card C and the player ID and sends the sent information to the server 2 via the communication unit 30. It is assumed that the player ID is input by a touch operation with a player's finger or the like at a suitable timing before the processing in step S22. The timing may be prior to the execution of the card event processing, for example, when the player terminal 1 is activated or when the execution of the game is started.

In step S41, upon receiving the sent information, the verification unit 132 of the server 2 executes card-ownership verification processing. The card-ownership verification processing refers to processing for verifying that a player is an owner of a card C of a kind identified with "a code representing the kind of the card C". Specifically, the verification unit 132 executes the card-ownership verification processing by determining whether or not the combination of the player ID and the code representing the kind of the card C, included in the sent information, matches <PID, [b1, b2, b3, ..., bn]>, i.e., the player registration information stored in the player registration information database 142, except SIR. That is, a match between the combination of the player ID and the code representing the kind of the card C, included in the sent information, and the player registration information (except SIR) stored in the player registration information database 142 indicates the presence of a matching entry in the player registration information database 142. In the case where a matching entry exists, the player is an owner of the card C of the kind identified by "the code representing the kind of the card C", and thus a verification result indicating a successful verification is obtained. On the other hand, in the case where there is no matching entry, the player is not acknowledged as an owner of the card C of the kind identified by "the code representing the kind of the card C", and thus a verification result indicating a failed verification is obtained. In step S42, the verification unit 132 sends a verification result indicating either a successful verification or a failed verification to the player terminal 1 via the communication unit 59.

In step S23, upon receiving the verification result via the communication unit 30, the determining unit 103 of the player terminal 1 determines whether or not the verification result indicates a successful verification.

In the case where the verification result indicates a failed verification, the determination in step S23 results in NO, and the processing proceeds to step S24. In step S24, the game executing unit 105 executes predetermined error processing. That is, in this case, the card event processing at the player terminal 1 is terminated without invoking the card event for the card C.

In the meantime, the verification result is also provided from the verification unit 132 to the card event control unit 133 at the server 2. In step S43, the card event control unit 133 determines whether or not the verification result indicates a successful verification. In the case where the verification result indicates a failed verification, as described above, the determination in step S43 results in NO, and the card event processing at the server 2 is also terminated.

On the other hand, in the case where the verification result indicates a successful verification, the determination in step S43 results in YES, and the processing proceeds to step S44. In step S44, the card event control unit 133 extracts, from the card event information database 143, the card event information associated with the code representing the kind of the card C, included in the sent information, and sends the card event information to the player terminal 1 via the communication unit 59. Then, the card event processing at the server 2 is terminated.

As described above, in this embodiment, predetermined kinds of card event information are stored in advance in the card event information database 143 in association with "the codes representing the kinds of cards C" assigned to the predetermined kinds. Here, it is assumed that card event information includes image data representing an invisible area including an object (graphic) on a card C.

In the meantime, also at the player terminal 1, the determination in step S23 results in YES, and the processing proceeds to step S25 when the card event information is received by the determining unit 103 via the communication unit 30. In step S25, the displayed-image determining unit 122 determines a relevant image to be used in the card event on the basis of the card event information, etc. In step S26, the display-mode determining unit 121 determines a display mode for the relevant image on the basis of the card event information and the position, orientation, etc. of the card C, recognized by the positional-relationship recognition unit 112. Specifically, in this embodiment, the display-mode determining unit 121 generates an affine matrix and executes the calculation processing in equation (1) given earlier, etc. In step S27, the display control unit 104 executes control to display, on the display unit 27, the relevant image determined through the processing in step S25 in the display mode determined through the processing in step S26. Then, the card event processing at the player terminal 1 is also terminated.

It is to be noted that, although the processing for recognizing the position and orientation of the card C is shown only at step S21 in FIG. 12 for convenience of explanation, there is a time lag between the processing in step S21 and the processing in step S26, and the position and orientation of the card C may have changed at the time of the processing in step S26. Furthermore, also in the case where the relevant image that is displayed through the processing in step S27 is a moving image, such as an animation, the position and orientation of the card C may change while the relevant image is being displayed. Thus, actually, the processing in step S21, step S25, and step S26 are executed independently in real time, and interrupts are allowed anytime before or during display of the relevant image. Accordingly, the relevant image is displayed in display modes following changes in the position and orientation of the card C, i.e., while changing the display mode as appropriate.

Although an embodiment of the present invention has been described above, it is to be noted that the present invention is not limited to the above-described embodiment and that modifications, improvements, etc. within a scope in which it is possible to achieve the object of the present invention are encompassed in the present invention.

For example, although the card event processing includes the verification processing (see step S41 in FIG. 12) in the embodiment described above, the verification processing is not particularly necessary. Specifically, in the case where the kind of the card is sent from the player terminal 1 in step S22 in FIG. 12, as described earlier, instead of executing steps S41 to S43, the server 2 may send card event information associated with the sent kind to the player terminal 1 in step S44.

By eliminating the verification processing as described above, it is possible to realize card events with high processing speed and low processing load. On the other hand, if card event processing is executed while executing the verification processing, as in the example in FIG. 12, it is possible to enhance the security level. Alternatively, it is possible to enhance the security level by employing processing different from that in the example in FIG. 12. For example, instead of the verification processing, authentication processing involving the serial number of the card C may be executed instead of the verification processing, as shown in FIG. 13. FIG. 13 is a flowchart for explaining an example of the flows of card event processing executed by the player terminal 1 and the server 2, which differs from the example in FIG. 12.

In step S61, the recognition unit 101 of the player terminal 1 in FIG. 6 recognizes the code representing the kind of the card C and the position and orientation of the card C. In step S62, the sent-information generating unit 102 generates sent information including the code representing the kind of the card C, the player ID, and the serial number and sends the sent information to the server 2 via the communication unit 30. It is assumed that the player ID and the serial number are input by a touch operation with a player's finger or the like at a suitable timing before the processing in step S62. The timing may be prior to the execution of the card event processing, for example, when the player terminal 1 is activated or when the execution of the game is started.

In step S81, the verification unit 132 of the server 2 executes authentication processing upon receiving the sent information. Specifically, the verification unit 132 executes the authentication processing by determining whether or not the combination <the player ID, the code representing the kind of the card C, the serial number>, included in the sent information, matches the player registration information <PID, [b1, b2, b3, . . . , bn], SIR> stored in advance in the player registration information database 142. That is, an authentication result "successful authentication" is obtained in the case of a match, and an authentication result "failed authentication" is obtained in the case of no match. In step S82, the verification unit 132 sends an authentication result indicating either a successful authentication or a failed authentication to the player terminal 1 via the communication unit 59.

In step S63, upon receiving the authentication result via the communication unit 30, the determining unit 103 of the player terminal 1 determines whether or not the authentication result indicates a successful authentication.

In the case where the authentication result indicates a failed authentication, the determination in step S63 results in NO, and the processing proceeds to step S64. In step S64, the game executing unit 105 executes predetermined error processing. That is, in this case, the card event processing at the player terminal 1 is terminated without invoking the card event for the card C.

In the meantime, the authentication result is also provided from the verification unit 132 to the card-event control unit 133 at the server 2. In step S83, the card-event control unit 133 determines whether or not the authentication result indicates a successful authentication. In the case where the authentication result indicates a failed authentication, as described above, the determination in step S83 results in NO, and the card event processing at the server 2 is also terminated.

On the other hand, in the case where the authentication result indicates a successful authentication, the determination in step S83 results in YES, and the processing proceeds to step S84. In step S84, the card-event control unit 133 extracts, from the card event information database 143, card event information associated with the code representing the kind of the card C, included in the sent information, and sends the card event information to the player terminal 1 via the communication unit 59.

Here, in order to further enhance the security level, the card event information may be stored in the card event information database 143 such that it is associated with the serial number in addition to or instead of the code representing the kind of the card C. In this case, in step S84, the card-event control unit 133 identifies the serial number from the code representing the kind of the card C, included in the sent information, extracts the card event information associated with the serial number from the card event information database 143, and send the card event information to the player terminal 1 via the communication unit 59.

Upon completion of this processing in step S84, the card event processing at the server 2 is terminated. Since the subsequent series of processing steps S65 to S67 at the player terminal 1 are the same as the series of processing steps S25 to S27 in FIG. 12, described earlier, a description thereof is omitted here.

Furthermore, for example, although a card C is placed on the touchscreen in the above-described embodiment, there is no particular limitation to this embodiment, and an arbitrary medium that can be placed on the touchscreen may be used. In this case, since it is possible to recognize the position and orientation of the medium relative to the touchscreen (the display surface), the size and shape of the medium do not particularly depend on the touchscreen and may be arbitrary.

For example, although the plurality of contact points are disposed on the bottom face of a medium (card C) in the above-described embodiment, there is no particular limitation to the embodiment, and the plurality of contact points may be disposed on the top face since simultaneous detection is possible with the touchscreen as long as they are disposed on the same face. Furthermore, the plurality of contact points that are disposed on the same face need not particularly be disposed only on just one face, such as the top face or the bottom face, and may be disposed on both the top face and the bottom face. In the case where the plurality of contact points are disposed on both faces, by adopting the same array for the plurality of contact points on both faces, the player can use the medium without having to be aware of the distinction between the top and bottom faces, which will be convenient for the player. On the other hand, in the case where different arrays are adopted for the plurality of contact points on the top face and the bottom face, it is possible to separately define a code representing the kind of the top face of the medium and a code representing the kind of the bottom face of the medium. This makes it possible, for example, to recognize a first object (an item, e.g., a sword) in the case where one of the faces is placed on the touchscreen and to recognize a second object (another item, e.g., a shield) in the case where the other face is placed on the touchscreen.

For example, although the layout pattern of the plurality of contact points follows the method and rules described with reference to FIGS. 7 to 10 in the above-described embodiment, there is no particular limitation to the embodiment, and it suffices for the layout pattern to enable recognition of the kind of the medium and the position and orientation of the medium relative to the display surface on the basis of at least some of the plurality of contact points in the case where the medium is placed on the display surface. Here, the kind of the medium need not particularly be represented by a code as in the above-described embodiment and may be represented by any information that can be expressed by at least some of the plurality of contact points.

The series of processing steps described above may be executed either by hardware or by software. In other words, the functional configuration in FIG. 6 is only an example, and there is no particular limitation to this example. That is, it suffices that an information processing system be provided with functions that enable the execution of the above-described series of processing steps as a whole, and the choice of functional blocks for implementing the functions is not particularly limited to the example in FIG. 6. Furthermore, the locations of the functional blocks are not particularly limited to those in FIG. 6 and may be arbitrarily set. For example, the functional blocks of the server 2 may be transferred to the player terminal 1, etc., and conversely, the functional blocks of the terminal 1 may be transferred to the server 2, etc. Furthermore, each functional block may be implemented by hardware alone, by software alone, or by a combination of hardware and software.

Specifically, for example, although the recognition unit 101, the determining unit 103, etc. are provided in the player terminal 1 as native applications in the above-described embodiment, these elements may be provided at the server 2 by implementing them as Web applications using HTML and JavaScript (registered trademark).

As another example, if card event information can be managed at the player terminal 1, the player terminal 1 can execute the above-described series of processing steps offline, without having to communicate with the server 2.

In a case where the series of processing steps is executed by software, a program constituting the software is installed on a computer, etc. via a network or from a recording medium. The computer may be a computer embedded in special hardware. Alternatively, the computer may be a computer that can execute various functions when various programs are installed thereon, such as a server or a general-purpose smartphone or personal computer.

A recording medium including such a program is implemented by a removable medium (not shown) that is distributed separately from the main unit of the apparatus in order to provide the program to a player, a recording medium that is provided to a player as embedded in the main unit of the apparatus, etc.

In this specification, steps dictated in the program recorded on the recording medium may include not only processing that is executed sequentially in order of time but also processing that is not executed sequentially in order of time but is executed in parallel or individually. Furthermore, in this specification, the term "system" should be construed to mean an overall apparatus constituted of a plurality of devices, a plurality of means, etc.

In other words, an information processing system according to the present invention may be embodied in various forms configured as follows, including the information processing system according to the above-described embodiment in FIG. 1. Specifically, an information processing system according to the present invention is an information processing system including: a terminal (e.g., the player terminal 1 in FIG. 6) including a display unit (e.g., the display unit 27 in FIG. 2) that displays an image on a predetermined display surface thereof; and a detecting unit (e.g., the touch-operation input unit 26 in FIG. 2) that is laid over the display surface and that detects, by a predetermined method, something brought into contact therewith or in proximity thereto a medium (e.g., the card C in FIG. 6) having a plurality of contact points detectable by the predetermined method, attached on the same face thereof; and an information processing apparatus (e.g., the server 2 in FIG. 6) that carries out communications with the terminal to send and receive information, wherein the information processing system comprises: recognition means (the recognition unit 101 in FIG. 6) for recognizing, in a case where the medium is placed on the display surface, a kind of the medium and a position and orientation of the medium relative to the display surface on the basis of at least some of the plurality of contact points detected by the detecting unit; and determining means (e.g., the determining unit 103 in FIG. 6) for determining a relevant image to be displayed on the display surface and determining a size, position, and orientation for displaying the relevant image on the display surface, on the basis of the results of recognition by the recognition means.

Here, assuming that the display unit that displays an image on a predetermined display surface thereof and the detecting unit that is laid over the display surface and that detects, by a predetermined method, something brought into contact therewith or in proximity thereto are collectively referred to as a "touchscreen", it becomes possible to realize a technology for recognizing a positional relationship of a medium relative to a touchscreen of an arbitrary size irrespective of the size or shape of the medium. Here, the positional relationship of the medium relative to the touch- screen refers to the following first to fourth attributes, as described earlier. The first attribute is the size ratio of the touchscreen (display) that displays a virtual space and the medium in the real space. The second attribute is the position at which the medium in the real space is placed relative to the touchscreen. The third attribute is the ratio of the size of one dot on the touchscreen, known as the DPI (dots per inch), to the medium. The fourth attribute is the angle of horizontal rotation (orientation) of the medium in the real space, placed on the touchscreen. That is, among the results of recognition by the recognition means, the position and orientation of the medium relative to the display surface correspond to the second attribute and the fourth attribute, respectively. Furthermore, since the size of the touchscreen (display surface) and the DPI are known, it is possible to readily calculate the first attribute and the third attribute on the basis of the position and orientation of the medium relative to the display surface. Accordingly, the determining means can determine a size, position, and orientation for displaying the relevant image on the display surface by using an image processing technology that enables, with the four attributes, coordination between an image in a virtual space and a medium existing in a space in the real world.

Owing to what has been described above, it becomes possible to recognize a physical medium by using a touchscreen alone, without having to use any device involving a risk of privacy invasion, such as a camera, or any device that is not sufficiently common, such as an NFC device. This makes it possible to establish a technology that enables seamless coordination between a virtual space displayed on a touchscreen and a medium such as a physical card in a state where the medium is placed on the touchscreen.

Here, the medium may have a feature based on the layout of at least some of the plurality of contact points. Furthermore, the recognition means may: recognize the feature on the basis of the layout of at least some of the plurality of contact points detected by the detecting unit, and recognize the kind, position, and orientation of the medium by using the feature.

As described above, it is possible to adopt a method of recognizing a medium by using a feature based on the layout of at least some of a plurality of contact points, instead of a method that readily enables recognition of a medium by a third party, such as a serial number. That is, it is difficult for a third party to recognize a medium since it is difficult for the third party to discover rules, etc. for the layout of at least some of the plurality of contact points disposed on the medium. This serves to effectively inhibit unauthorized use of the medium. On the other hand, for a manufacturer, etc., it is possible to define a "feature" that enables recognition of the kind, position, and orientation of the medium just with the layout of at least some of the plurality of contact points. In other words, it is possible to provide a medium that enables recognition of the kind, position, and orientation thereof just by disposing a plurality of contact points on the medium in a defined layout. That is, there is no need to include in the medium a semiconductor part such as a CPU, a battery, etc., which raise costs. Thus, it is possible to easily and inexpensively manufacture the medium and prepare games, etc. using the medium.

The medium may include a first feature that enables identification of the position and orientation of the medium relative to the display surface. Furthermore, the recognition means may: recognize the first feature on the basis of the layout of at least some of the plurality of contact points detected by the detecting unit, and recognize the position and orientation of the medium by using the first feature. In this case, for example, the first feature may be a feature identified from a positional relationship among the contact points individually laid out at three predetermined vertices among the four vertices of a minimum bounding rectangle identified from the plurality of contact points attached to the medium.

As described above, it becomes possible to accurately identify the position and orientation of the medium with a simple method, such as the layout of at least some of the plurality of contact points. Furthermore, although a single round of recognition processing suffices for the kind of the medium in most cases, processing for recognizing the position and orientation of the medium needs to be executed a plurality of times, or desirably in real time, since the position and orientation may change as time elapses. Thus, it is preferable if processing for recognizing the position and orientation of the medium can be executed at low load and independently of processing for recognizing the kind of the medium. The use of a medium having the first feature makes it possible to realize such recognition processing.

The medium may include a second feature that enables identification of the kind of the medium. The recognition means may: recognize the second feature on the basis of the layout of at least some of the plurality of contact points detected by the detecting unit, and recognize the kind of the medium by using the second feature. In this case, the second feature may be a feature value based on a line segment interconnecting predetermined two of the contact points attached to the medium. Furthermore, the medium may be associated in advance with a code represented by a combination of a plurality of such feature values based on a predetermined rule.

In the case where media are used in a game, there is a need for a number of kinds of media corresponding to the number of kinds of characters, items, enemy monsters, etc. that appear in the game. By using the second feature, which is based on the layout of at least some of the plurality of contact points, it becomes possible to readily manufacture such a huge number of kinds of media. For example, in the case where a feature value based on a line segment interconnecting predetermined two of the contact points attached to the medium is adopted as the second feature value and a combination of a plurality of such feature values based on a predetermined rule is adopted as a code representing the kind of the medium, assuming that it is possible to define P (P is an arbitrary integer greater than or equal to 1, and P=33 in the above-described embodiment) kinds of feature values, it becomes possible to easily define at least $2^P$ (about 8.6 billion in the above-described case of P=33) kinds of media.

The determining means may: by using, as a reference image, the relevant image that is displayed in a state where the medium is not placed on the display surface, and by generating an affine transformation matrix including, as elements thereof, parameters representing a magnification ratio, an amount of movement, and an amount of rotation of the relevant image relative to the reference image, determine a size, position, and orientation for displaying the relevant image on the display surface.

In the case where such an affine transformation matrix is generated, there is high compatibility with existing graphic models. Since affine transformation matrices are commonly used in processing for translation or rotation of both 2D and 3D images, they can be applied directly to existing frameworks and libraries. This is convenient and serves to reduce the manufacturing costs of the system as a whole.

The medium may have a transparent area that is transparent at at least a portion of the relevant image displayed on the display surface.

This enables a player to readily view a scene involving seamless coordination between a virtual space displayed on a touchscreen and a medium such as a physical card in a state where the medium is placed on the touchscreen.

An object related to the relevant image may be shown in the transparent area of the medium. Furthermore, the determining means may determine the size, position, and orientation of the relevant image in accordance with the object.

This enables seamless coordination between an object shown on a physical medium placed on a touchscreen and a virtual space (relevant image) displayed on the touchscreen. For example, it becomes possible to realize a presentational effect that looks as if a character or the like in a virtual space in the display surface of a terminal recognized and responded in real time to a movement of a medium in the real world.

In this case, if the kind, position, and orientation of the medium are recognized at the terminal, by notifying the server of the kind, the server can provide various kinds of services related to the game and using the medium. As such a server, it is preferable to adopt a server including: management means for managing, for each of a plurality of media, the kind and the object in association with each other: recognition means for recognizing the kind of one of the plurality of media in a case where the medium is placed on the display surface at the terminal, the kind of the medium and a position and orientation of the medium relative to the display surface are recognized on the basis of at least some of the plurality of contact points detected by the detecting unit, and a notification of the kind of the medium is received; and providing means for identifying the object associated with the recognized kind of the medium among the plurality of media and providing the terminal with, among information about the identified object, information that serves as an aid in processing for determining a relevant image to be displayed on the display surface and determining a size, position, and orientation for displaying the relevant image on the display surface.

EXPLANATION OF REFERENCE NUMERALS 1, 1-1 to 1-*m* Player terminals
2 Server
21 CPU
26 Touch-operation input unit
27 Display unit
51 CPU
101 Recognition unit
102 Sent-information generating unit
103 Determining unit
104 Display control unit
111 Kind recognition unit
112 Positional-relationship recognizing unit
121 Display-mode determining unit
122 Displayed-image determining unit
131 Registration unit
132 Verification unit
133 Card-event control unit
141 Card registration information database
142 Player registration information database
143 Card event information database
C, C-1 to C-n Cards

The invention claimed is:

1. An information processing system comprising:
a terminal including:
   a display that displays an image on a predetermined display surface thereof, and
   one or more position input sensors laid over the display surface and configured to detect, by a predetermined method, something brought into contact therewith or in proximity to the display;
a physical medium having a plurality of contact points and a graphic on a surface of the physical medium detectable by the predetermined method, and the physical medium having a first feature and a second feature based on a layout of at least two of the plurality of contact points,
an information processing apparatus that carries out communications with the terminal to send and receive information,
wherein the information processing system comprises:
   a processor configured for recognizing, in a case where the surface of the physical medium is placed on the display surface, a kind of the physical medium and a position and orientation of the graphic relative to the display surface based on the first feature of the physical medium,
   wherein the processor configured to recognize the first feature and the second feature based on the layout of at least two of the plurality of contact points detected by the one or more position input sensors,
   wherein the processor configured to recognize, as the first feature that enables identification of a position and an orientation of the physical medium relative to the display surface, reference points placed on three predetermined vertices among four vertices of a minimum bounding rectangle that is identified by using the plurality of contact points attached to the physical medium,
   wherein the reference points include a contact point located at a vertex at an angle equal to a right angle in a line connecting the three predetermined vertices, and
   wherein the processor is configured to recognize, as the second feature that enables identification of a predetermined kind of the physical medium, each contact point based on the reference points,
   wherein the processor is configured to determine a relevant image to be displayed on the display surface and determining a size, position, and orientation for displaying the relevant image on the display surface, based on results of recognition by the processor, and
   wherein the relevant image is a superimposition of the graphic to a predetermined area of the display surface.

2. The information processing system according to claim 1, wherein the processor is configured to execute error processing when recognizing that the contact points are laid out at all of the four vertices of the minimum bounding rectangle.

3. The information processing system according to claim 1, wherein the second feature is a feature value based on a line segment interconnecting predetermined two of the contact points attached except the line connecting the three predetermined vertices, and wherein the physical medium is associated in advance with a code represented by a combination of a plurality of such feature values based on a predetermined rule.

4. The information processing system according to claim 1, wherein the processor configured for:
   using, as a reference image, the relevant image that is displayed in a state where the physical medium is not placed on the display surface, and
   generating an affine transformation matrix including, as elements thereof, parameters representing a magnification ratio, an amount of movement, and an amount of rotation of the relevant image relative to the reference image,
   determining a size, position, and orientation for displaying the relevant image on the display surface.

5. The information processing system according to claim 1, wherein the physical medium has a transparent area that is transparent at least a portion of the relevant image displayed on the display surface.

6. The information processing system according to claim 5, wherein an object related to the relevant image is shown as the graphic in the transparent area of the physical medium, and wherein the processor determines the size, position, and orientation of the relevant image in accordance with the object.

7. A non-transitory computer readable medium storing a program for an information processing system including:
a terminal including
   a display that displays an image on a predetermined display surface thereof; and
   one or more position input sensors laid over the display surface and configured to detect, by a predetermined method, something brought into contact therewith or in proximity to the display;
a physical medium having a plurality of contact points and a graphic on a surface of the physical medium detectable by the predetermined method, and the physical medium having a first feature and a second feature based on a layout of at least two of the plurality of contact points,
an information processing apparatus that carries out communications with the terminal to send and receive information,
wherein the program causes at least one of the terminal and the information processing apparatus to execute control processing comprising:
   recognizing, by a processor in a case where a surface of the physical medium is placed on the display surface, a kind of the physical medium and a position and orientation of the graphic relative to the display surface based on the first feature of the physical medium;
   recognizing, by the processor, the first feature and the second feature based on the layout of at least two of the plurality of contact points detected by the one or more position input sensors;
   recognizing, by the processor, as the first feature that enables identification of a position and an orientation of the physical medium relative to the display surface, reference points placed on three predetermined vertices among four vertices of a minimum bounding rectangle that is identified by using the plurality of contact points attached to the physical medium,
   wherein the reference points include a contact point located at a vertex at an angle equal to a right angle in a line connecting the three predetermined vertices;
   recognizing, by the processor, as the second feature that enables identification of a predetermined kind of the physical medium, each contact point based on the reference points; and determining, by a processor a relevant image to be displayed on the display surface and determining a size, position, and orientation for displaying the relevant image on the display surface, based on results of recognition by the processor, wherein the relevant image is a superimposition of the graphic to a predetermined area of the display surface.

8. A server in an information processing system including:
a terminal that is operated by a player, the terminal including
 a display that displays an image on a predetermined display surface thereof, and
 one or more position input sensors laid over the display surface and configured to detect, by a predetermined method, something brought into contact therewith or in proximity to the display;
a plurality of physical media each having a plurality of contact points and a graphic showing a predetermined object on a surface of each of the physical media detectable by the predetermined method, and each of the plurality of physical having a first feature and a second feature based on a layout of the at least two of the plurality of contact points,
the server, which carries out communications with the terminal to send and receive information, wherein the server comprises:
 a processor configured for:
  managing, for each of the plurality of physical media, a kind of the physical medium and the object in association with each other;
  recognizing, in a case where one of the plurality of physical media is placed on the display surface at the terminal, a kind of the one of the plurality of physical media and a relative position and orientation of the graphic of the one of the plurality of physical media relative to the display surface are recognized based on the first feature of the physical medium,
  recognizing the first feature and the second feature based on the layout of at least two of the plurality of contact points detected by the one or more position input sensors,
  recognizing, as the first feature that enables identification of a position and an orientation of the one of the plurality of physical media relative to the display surface, reference points placed on three predetermined vertices among four vertices of a minimum bounding rectangle that is identified by using the plurality of contact points attached to the one of the plurality of physical media,
  wherein the reference points include a contact point located at a vertex at an angle equal to a right angle in a line connecting the three predetermined vertices,
  recognizing, as the second feature that enables identification of a predetermined kind of the one of the plurality of physical media, each contact point based on the reference points, and
  identifying the object associated with the recognized kind of the one of the plurality of physical media among the plurality of physical media and providing the terminal with, among information about the identified object, information that serves as an aid in processing for determining a relevant image to be displayed on the display surface and determining a size, position, and orientation for displaying the relevant image on the display surface, wherein the relevant image is a superimposition of the graphic to a predetermined area of the display surface.

9. A terminal comprising:
a display that displays an image on a predetermined display surface thereof;
one or more position input sensors laid over the display surface and configured to detect, by a predetermined method, something brought into contact therewith or in proximity to the display;
a processor configured to recognize, in a case where a physical medium having a plurality of contact points detectable by the predetermined method and having a first feature and a second feature based on a layout of at least two of the plurality of contact points, attached on the same face thereof, is placed on the display surface, a kind of the physical medium and a position and orientation of a graphic on a surface of the physical medium relative to the display surface based on the first feature of the physical medium;
wherein the processor configured to recognize the first feature and the second feature based on the layout of at least two of the plurality of contact points detected by the one or more position input sensors;
wherein the processor configured to recognize, as the first feature that enables identification of a position and an orientation of the physical medium relative to the display surface, reference points placed on three predetermined vertices among four vertices of a minimum bounding rectangle that is identified by using the plurality of contact points attached to the physical medium,
wherein the reference points include a contact point located at a vertex at an angle equal to a right angle in a line connecting the three predetermined vertices;
wherein the processor is configured to recognize, as the second feature that enables identification of a predetermined kind of the physical medium, each contact point based on the reference points; and
wherein the processor is configured to determine a relevant image to be displayed on the display surface and that determines a size, position, and orientation for displaying the relevant image on the display surface, on the basis of the results of recognition by the processor,
wherein the relevant image is a superimposition of the graphic on the surface of the physical medium to a predetermined area of the display surface, wherein an orientation of the graphic is recognized based on the feature of the physical medium.

10. A card placed on a predetermined display surface of a terminal, wherein the terminal includes: a display that displays an image on the predetermined display surface thereof, and one or more position input sensors laid over the display surface and configured to detect, by a predetermined method, something brought into contact therewith or in proximity to the display, wherein the card comprises:
a plurality of contact points detectable by the predetermined method;
a graphic on a surface of the card detectable by the predetermined method;
wherein a positional relationship determined between at least two of the plurality of contact points are laid out so as to enable the terminal to recognize a kind of the card and a position and orientation of the graphic relative to the display surface, wherein an orientation of the graphic is recognized based on the layout of the plurality of contact points determined from the positional relationship, wherein the graphic is superimposed as a relevant image on a predetermined area of the display surface, and wherein the card includes a first feature that enables identification of the position and orientation of the card relative to the display surface, reference points placed on three predetermined vertices among four vertices of a minimum bounding rectangle that is identified by using the plurality of contact points attached to the card, the reference points include a contact point located at a vertex at an angle equal to a right angle in a line connecting the three predetermined vertices, and a second feature that enables identification of the kind of the card, each contact point based on the reference points.

* * * * *